US010804743B2

(12) United States Patent
Keeling et al.

(10) Patent No.: US 10,804,743 B2
(45) Date of Patent: Oct. 13, 2020

(54) SURFACE FLUX CONTROL FOR INDUCTIVE WIRELESS CHARGING SYSTEMS

(71) Applicant: WiTricity Corporation, Watertown, MA (US)

(72) Inventors: Nicholas Athol Keeling, Munich (DE); Grzegorz Ombach, Munich (DE); Edward Van Boheemen, Munich (DE)

(73) Assignee: WiTricity Corporation, Watertown, MA (US)

( * ) Notice: Subject to any disclaimer, the term of this patent is extended or adjusted under 35 U.S.C. 154(b) by 196 days.

(21) Appl. No.: 15/806,672

(22) Filed: Nov. 8, 2017

(65) Prior Publication Data
US 2019/0140481 A1 May 9, 2019

(51) Int. Cl.
*H02J 50/12* (2016.01)
*H02J 7/00* (2006.01)
(Continued)

(52) U.S. Cl.
CPC ............ *H02J 50/12* (2016.02); *B60L 53/12* (2019.02); *H02J 7/007* (2013.01); *H02J 7/025* (2013.01); *H02J 50/60* (2016.02); *H02J 50/70* (2016.02)

(58) Field of Classification Search
CPC .. H02J 50/12; H02J 7/007; H02J 50/60; H02J 50/70; H02J 7/025; H02J 50/10;
(Continued)

(56) References Cited

U.S. PATENT DOCUMENTS

| 2014/0015329 A1* | 1/2014 | Widmer | G01D 5/2006 |
| | | | 307/104 |
| 2014/0125276 A1* | 5/2014 | Lampinen | H02J 7/025 |
| | | | 320/108 |
| 2014/0266018 A1 | 9/2014 | Carobolante | |
| 2015/0357832 A1* | 12/2015 | Tseng | H04B 5/0081 |
| | | | 307/104 |

(Continued)

FOREIGN PATENT DOCUMENTS

WO 2009122355 10/2009

OTHER PUBLICATIONS

"International Search Report and Written Opinion", PCT Application No. PCT/US2018/059570, dated Jan. 21, 2019, 9 pages.
(Continued)

*Primary Examiner* — Drew A Dunn
*Assistant Examiner* — Sailesh Thapa
(74) *Attorney, Agent, or Firm* — Colby Nipper PLLC

(57) ABSTRACT

The present disclosure describes techniques for estimating or measuring changes in peak magnetic flux levels based on the influence of a receive coil to the overall flux density over a transmit coil. The estimated or measured changes in peak magnetic flux levels are used to adjust currents in the coils to reduce the flux density while maintaining sufficient power transfer. In some aspects, an apparatus for controlling power transfer is provided. The apparatus includes a controller configured to receive or determine a measured or estimated magnetic flux level on or outside a housing configured to house a transmit coil. The controller is further configured to determine an electrical current level for at least one or both of the transmit coil or a receive coil that reduces a peak magnetic flux density level in proximity to the transmit coil based on the measured or estimated magnetic flux level.

26 Claims, 18 Drawing Sheets

(51) Int. Cl.
  *H02J 50/60* (2016.01)
  *H02J 50/70* (2016.01)
  *H02J 7/02* (2016.01)
  *B60L 53/12* (2019.01)

(58) Field of Classification Search
  CPC .......... H02J 50/90; H02J 50/40; H02J 50/005; H02J 7/00034; H02J 50/80; H02J 7/0029; H02J 7/0047; H02J 5/005; H02J 7/00; H02J 7/0042; H02J 7/0044; H02J 7/00308; H02J 7/027; H02J 2310/48; H02J 50/00; H02J 50/50; H02J 7/00304; H02J 7/02; H02J 50/001; H02J 50/20; H02J 50/402; H02J 7/0024; H02J 7/00712; H02J 7/022; B60L 53/12
  See application file for complete search history.

(56) References Cited

U.S. PATENT DOCUMENTS

| 2016/0079797 | A1* | 3/2016 | Jeong | H02J 7/025 320/108 |
| 2016/0218520 | A1* | 7/2016 | Mehas | H02J 50/12 |
| 2016/0218559 | A1* | 7/2016 | Mehas | H02J 50/60 |
| 2016/0285278 | A1* | 9/2016 | Mehas | H02J 50/12 |
| 2017/0237293 | A1* | 8/2017 | Faraone | H02J 50/80 713/300 |

OTHER PUBLICATIONS

"International Preliminary Report on Patentability", PCT Application No. PCT/US2018/059570, dated May 22, 2020, 8 pages.

* cited by examiner

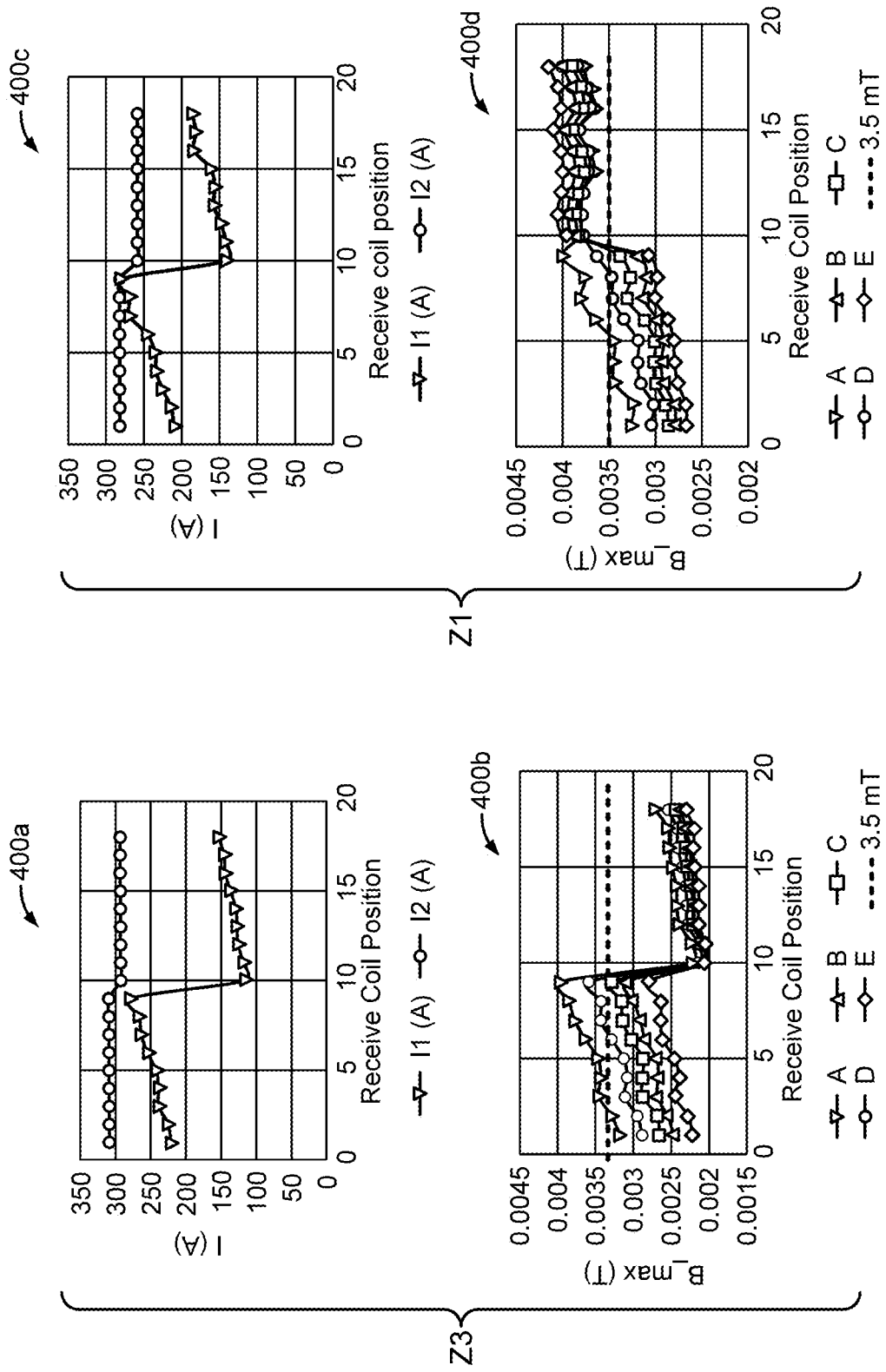

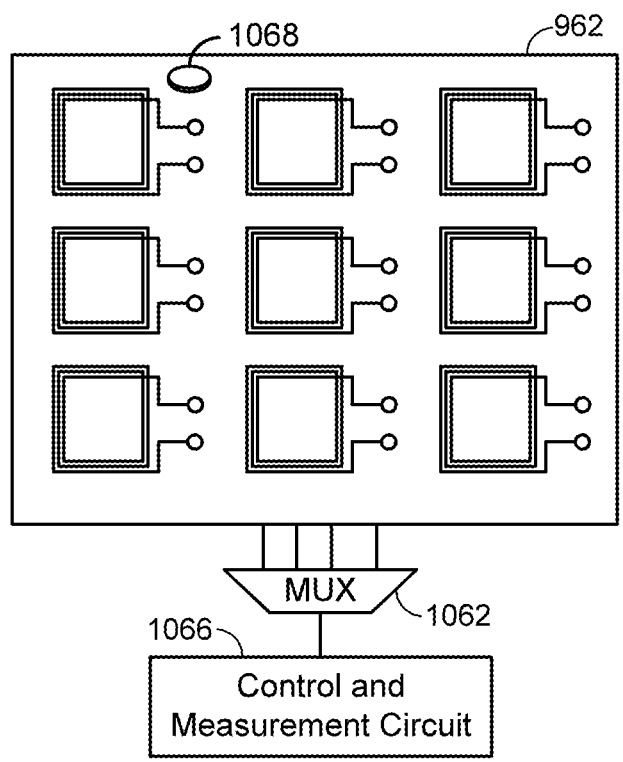
FIG. 10C
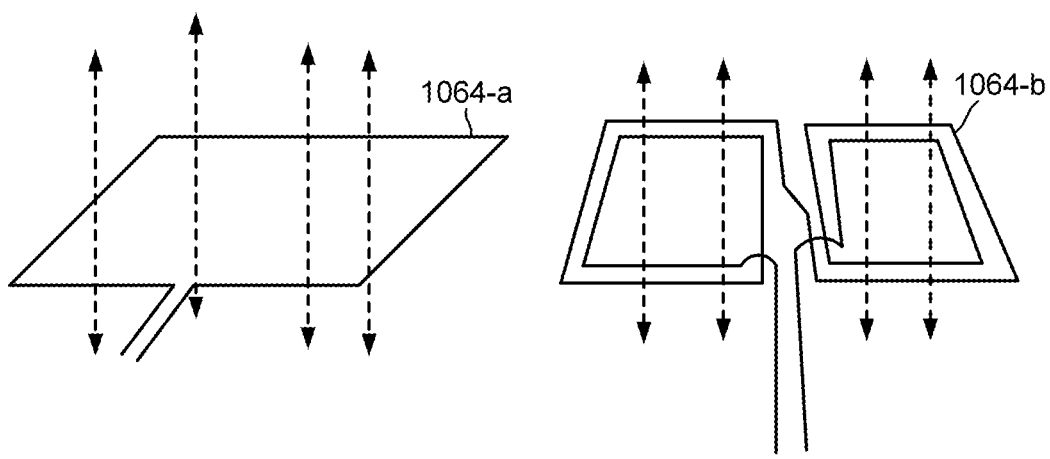
FIG. 10D  FIG. 10E

SURFACE FLUX CONTROL FOR INDUCTIVE WIRELESS CHARGING SYSTEMS

FIELD

The present disclosure relates generally to inductive wireless power transfer, and particularly to controlling magnetic flux levels at a surface of a wireless power transmitter.

BACKGROUND

Wireless power transfer is the transmission of electrical energy from a power source to an electrical load without the use of conductors, such as interconnecting wires. Wireless power is a generic term that refers to a number of different power transmission technologies that use time-varying electric, magnetic, or electromagnetic fields. In wireless power transfer, a wireless transmitter connected to a power source transmits field energy across an intervening space to one or more receivers, where it is converted back to an electrical current and then used. Wireless transmission is useful to power electrical devices in cases where interconnecting wires are inconvenient, hazardous, or are not possible. For example, wireless power transfer may be used to charge electric vehicles or for other applications such as for wirelessly charging portable electronic devices. Solutions for improving efficiency, cost effectiveness, and safety of a wireless power system are desired.

SUMMARY

Systems and methods are described to reduce magnetic flux density in air around a power-transfer structure (e.g., in a wireless electric vehicle charging (WEVC) transmitter/pad). In particular, the techniques described in this document reduce the flux density that is generated directly above a transmit coil of a wireless charging pad. Reducing the flux density reduces heat produced in foreign metal objects that are affected by the magnetic field generated by the coils. This includes foreign metal objects that are not detected by a foreign object detection (FOD) system but which, when exposed to magnetic fields, can generate heat at undesirable levels. Therefore, reducing the flux density makes the wireless charging pad less susceptible to undesirable heating of certain objects.

Aspects include techniques for estimating or measuring changes in peak magnetic flux levels in different scenarios based on the influence of the receive coil to the overall flux density over the transmit coil. The estimated or measured changes in peak magnetic flux levels are used to adjust currents in the coil to reduce the flux density while maintaining sufficient power transfer.

In some aspects, an apparatus for controlling wireless power transfer is provided. The apparatus includes a controller operatively connected to at least one or both of a wireless power receive circuit that includes a receive coil or a wireless power transmit circuit that includes a transmit coil configured to inductively transfer power to the receive coil via a magnetic field. The controller is configured to receive or determine a measured or estimated magnetic flux level on or outside a surface of a housing configured to house the transmit coil. The controller is further configured to determine an electrical current level for at least one or both of the transmit coil or the receive coil that reduces a peak magnetic flux density level in proximity to the transmit coil based on the measured or estimated magnetic flux level. The controller is further configured to provide the electrical current level to at least one or both of the wireless power receive circuit or the wireless power transmit circuit to cause adjustment of electrical current in at least one or both of the transmit coil or the receive coil based on the determined electrical current level.

In another aspect, a method for controlling wireless power transfer is provided. The method includes receiving or determining a measured or estimated magnetic flux level on or outside a surface of a housing configured to house a transmit coil configured to inductively transfer power to a receive coil via a magnetic field. The method further includes determining an electrical current level for at least one or both of the transmit coil or the receive coil that reduces a peak magnetic flux density level in proximity to the transmit coil based on the measured or estimated magnetic flux level. The method further includes providing the electrical current level to at least one or both of a wireless power receive circuit that includes the receive coil or a wireless power transmit circuit that includes the transmit coil to cause adjustment of electrical current in at least one or both of the transmit coil or the receive coil based on the determined electrical current level.

In yet another aspect, an apparatus for controlling wireless power transfer is provided. The apparatus includes means for receiving or determining a measured or estimated magnetic flux level on or outside a surface of a housing configured to house a transmit coil configured to inductively transfer power to a receive coil via a magnetic field. The apparatus further includes means for determining an electrical current level for at least one or both of the transmit coil or the receive coil that reduces a peak magnetic flux density level in proximity to the transmit coil based on the measured or estimated magnetic flux level. The apparatus further includes means for providing the electrical current level to at least one or both of a wireless power receive circuit that includes the receive coil or a wireless power transmit circuit that includes the transmit coil to cause adjustment of electrical current in at least one or both of the transmit coil or the receive coil based on the determined electrical current level.

In yet another aspect, an apparatus for wireless power transfer is provided. The apparatus includes a wireless power receive circuit comprising a receive coil configured to inductively receive power via a magnetic field. The apparatus further includes a controller operably connected to the power receive circuit. The controller is configured to receive or determine a measured or estimated magnetic flux level on or outside a surface of a housing configured to house a transmit coil configured to generate the magnetic field. The controller is further configured to determine an electrical current level for the receive coil that reduces a peak magnetic flux density level in proximity to the transmit coil based on the measured or estimated magnetic flux level. The controller is further configured to provide the electrical current level to the wireless power receive circuit. The power receive circuit is further configured to adjust electrical current in the receive coil based on the determined electrical current level.

In yet another aspect, an apparatus for wireless power transfer is provided. The apparatus includes a wireless power transmit circuit comprising a transmit coil configured to generate a magnetic field to inductively transmit power. The apparatus further includes a controller operably connected to the power transmit circuit. The controller is configured to receive or determine a measured or estimated magnetic flux level on or outside a surface of a housing configured to house the transmit coil. The controller is further configured to determine an electrical current level for the transmit coil that reduces a peak magnetic flux density level in proximity to the transmit coil based on the measured or estimated magnetic flux level. The controller is further configured to provide the electrical current level to the wireless power transmit circuit. The power transmit circuit is further configured to adjust electrical current in the transmit coil based on the determined electrical current level.

In yet another aspect, an apparatus for wireless power transfer is provided. The apparatus includes a power receive circuit comprising a receive coil configured to inductively receive power via a magnetic field. The apparatus further includes one or more foreign object detection sensors configured to monitor an area over a transmit coil configured to generate the magnetic field, the area having a size corresponding more closely with a size of a housing configured to house the receive coil than to a size of the transmit coil, the size smaller than an outer dimension of the transmit coil.

In yet another aspect, a system for wireless power transfer is provided. The system includes a power transmit circuit comprising a transmit coil configured to generate a magnetic field, the transmit coil having a first outer dimension. The system further includes a transmit controller operatively connected to the power transmit circuit and configured to control one or more operations of the power transmit circuit. The system further includes a first foreign object detection circuit operatively connected to the transmit controller and configured to detect one or more objects within the magnetic field. The system further includes a power receive circuit comprising a receive coil configured to inductively receive power via the magnetic field, the receive coil having a second outer dimension smaller than the first outer dimension. The system further includes a receive controller operatively connected to the power receive circuit and configured to control one or more operations of the power receive circuit. The system further includes a second foreign object detection circuit operatively connected to at least one of the power transmit controller or the power receive controller, the second foreign object detection circuit configured to monitor an area over the transmit coil, the area having a first size corresponding more closely with a size of the second outer dimension of the receive coil than to a second size of the first outer dimension of the transmit coil.

BRIEF DESCRIPTION OF THE DRAWINGS

In the figures, the left-most digit of a reference number identifies the figure in which the reference number first appears. The use of the same reference numbers in different instances in the description or the figures indicates like elements.

FIGS. 4A and 4B are plots that further illustrate the influence of the wireless power receive circuit to the overall flux density on the surface of a housing of the wireless power transmit circuit.

FIG. 10C illustrates a foreign object detection circuit with a plurality of conductive loops configured to detect an object.

FIG. 10D illustrates a conductive loop having a circular configuration for detecting a first directional component of the magnetic field.

FIG. 10E illustrates another conductive loop having a double D configuration for detecting a second (different) directional component of the magnetic field as compared to FIG. 10D.

DETAILED DESCRIPTION

Figure 1:
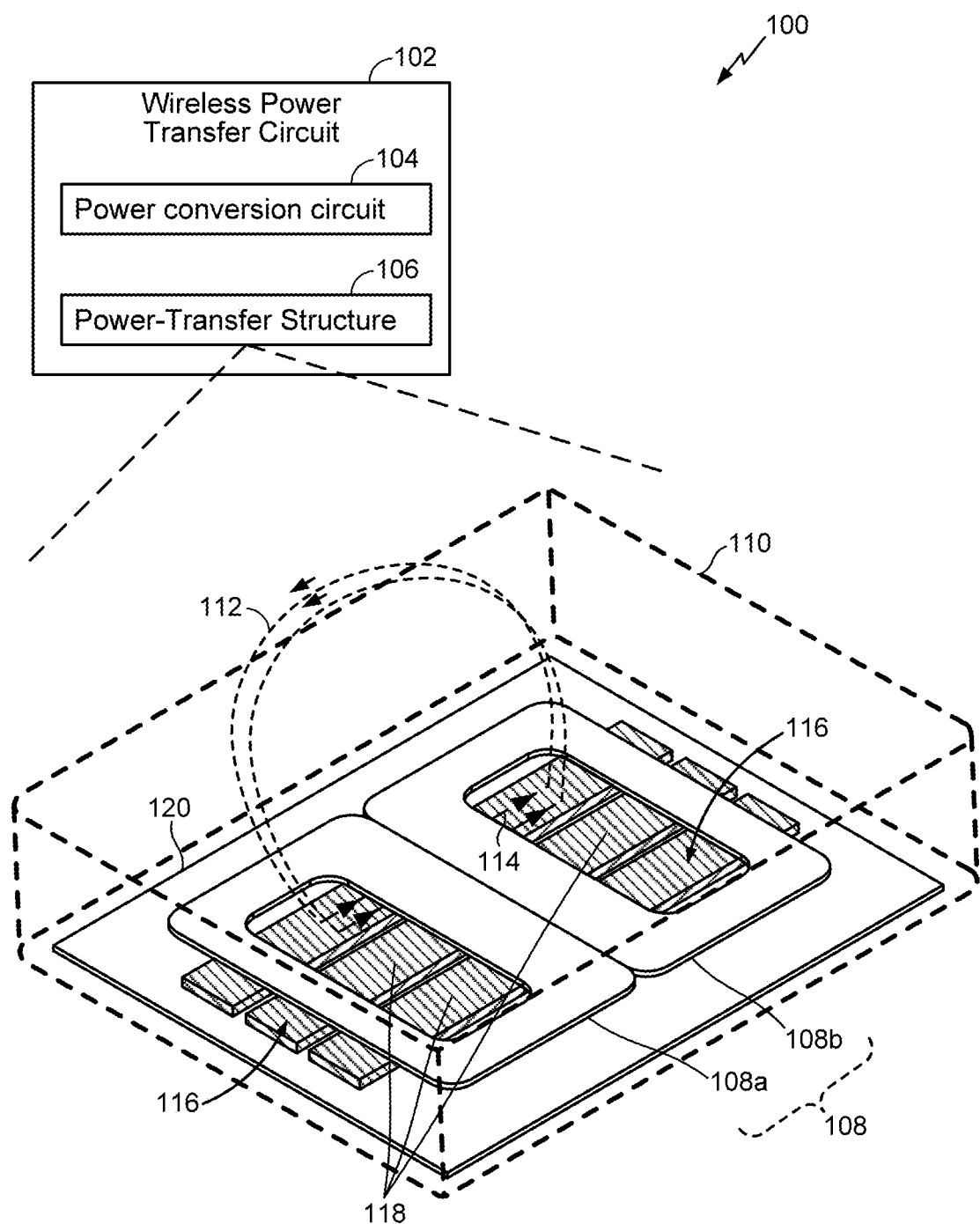
FIG. 1 illustrates an example implementation of a wireless power transfer circuit.

The detailed description set forth below in connection with the appended drawings is intended as a description of exemplary implementations and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form. Drawing elements that are common among the following figures may be identified using the same reference numerals.

Wirelessly transferring power involves transferring energy through electric fields, magnetic fields, electromagnetic fields, or otherwise from a transmitter to a receiver without the use of physical electrical conductors (e.g., power may be transferred through free space). The power output into a wireless field (e.g., a magnetic field) may be transmitted, received, captured, or coupled by a "power transfer element" to achieve power transfer.

Magnetic flux densities above a transmit coil (e.g., a primary coil) and below a receive coil (e.g., secondary coil) can be at relatively high levels to allow for sufficient power transfer (e.g., for a wireless electric vehicle charging system (WEVC) power may be transferred on the order of kilowatts—e.g., 3.3 kW, 11 kW, and the like). For this reason, foreign object detection (FOD) may be implemented to detect metal objects or other objects that are affected by a magnetic field generated by the coils. Foreign object detection systems, however, may be complicated or costly when they are configured to be sufficiently sensitive to detect all foreign objects of all sizes affected by the magnetic field. Temperatures of a metal objects affected by a high flux density zone of the magnetic field can increase to undesirable levels if flux levels are above certain levels.

Aspects of implementations described herein include techniques for estimating or measuring changes in peak magnetic flux levels in different scenarios based on the influence of the receive coil to the overall flux density over the transmit coil. The estimated or measured changes in peak magnetic flux levels are used to adjust currents in the coils to reduce the flux density while maintaining sufficient power transfer.

FIG. 1 illustrates an example implementation 100 of a wireless power transfer circuit 102. The wireless power transfer circuit 102 is used for energy transfer from a power source to a remote system (not shown). The wireless power transfer circuit 102 may depict either a wireless power transmit circuit that generates a magnetic field 112 for transferring power or a wireless power receive circuit that can couple and receive power via the magnetic field 112. The wireless power transfer circuit 102 includes a power conversion circuit 104 and a power-transfer structure 106. When the wireless power transfer circuit 102 is configured as a wireless power transmit circuit, the power conversion circuit 104 is configured to convert power from a power source (not shown) to a suitable operating frequency and form for wireless power transfer via the power-transfer structure 106. When the wireless power transfer circuit 102 is configured as a wireless power receive circuit, the power conversion circuit is configured to convert power received via the power-transfer structure 106 into a suitable form (e.g., voltage level) for providing power to a load, such as a battery.

The power-transfer structure 106 (also referred to as a "pad") is configured to wirelessly transmit or receive power. The power transfer structure 106 includes a coil 108 configured to generate an alternating magnetic field when driven with a current by the power conversion circuit 104. The power transfer structure further includes ferrite 116 configured to channel and/or provide a path for magnetic flux (e.g., may be arranged in one or more ferrite bars 118 which can be a combination of ferrite tiles arranged to form the bards). The power transfer structure also includes a shield 120. The shield is configured to prevent the magnetic field 112 or associated electromagnetic emissions from extending beyond the shield 120. As an example, the shield may be formed from aluminum. In some cases, the shield can be formed from a part of the apparatus the power transfer structure 106 is attached to. For example, in a vehicle the shield 120 may be formed from the underside aluminum portions of the underside housing/structure of the vehicle. In other implementations the shield 120 is part of the power transfer structure 106.

In the illustrated example, the power-transfer structure 106 includes a double-D (DD) topology, which includes two electrically conductive coils 108a and 108b disposed proximate to one another. In one example, the coil 108a is adjacent to and co-planar with the coil 108b. The coils 108a and 108b are configured to generate a magnetic field 112 by running current through the coils 108a and 108b. Generally, the current in the center of the pad runs in the same direction. For example, the current in the coil 108a may run in a clockwise direction while the current in the coil 108b may run in a counterclockwise direction. In this way, a high magnetic field strength is generated in the center of the pad (e.g., may arch in a horizontal direction between the poles/openings above the pad) and is channeled through the ferrite 116 between the openings in the coil 108a and 108b. While the power-transfer structure 106 is shown as including separate coils, DD coil topologies can include two separate conductors, or a single conductor wound to form a DD coil topology, and multiple turns are contemplated in various applications.

Figure 1A:
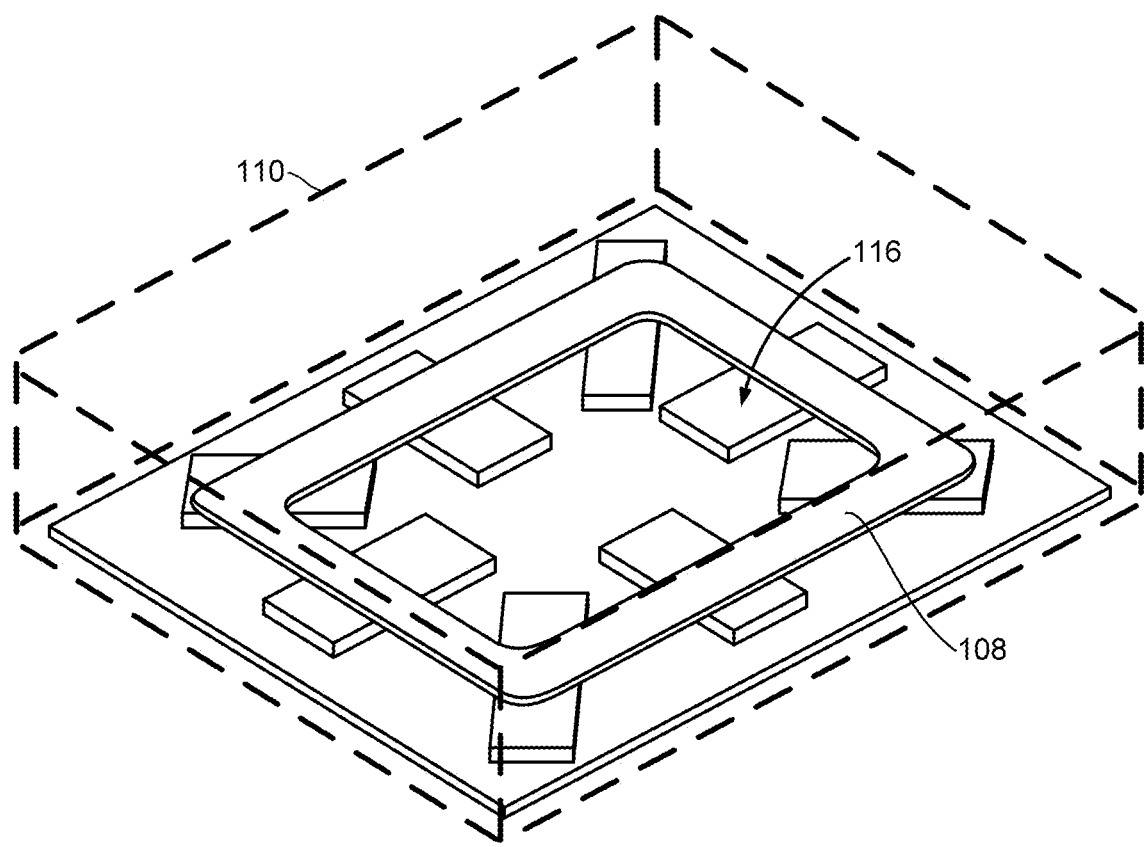
FIG. 1A illustrates an example of a circular coil topology as compared to the topology shown in FIG. 1.

Other coil topologies are also applicable to the techniques described herein, including a multi-coil topology (e.g., Bi-Polar, Double-D plus quadrature (DDQ)) or a single coil topology (e.g., circular coil). For example, FIG. 1A illustrates an example of a circular coil topology with a coil 108 (that may have multiple turns) with ferrite 116 extending in a direction aligned with a magnetic field direction generated by the coil. The principles described herein may apply to any of these coil topologies.

In the illustrated example of FIG. 1, magnetic flux 114 induced by the magnetic field 112 passes through ferrite 116 disposed proximate to the coils. Here, the ferrite 116 is substantially orthogonal to the coils 108a and 108b in the center of the pad, resulting in the flux 114 passing in a straight line through the length of the pad. In an ideal case, a monolithic ferrite slab (in which 100% of the volume is used for ferrite) would be used. However, it may not be practical to make or use such slabs in large sizes using current manufacturing techniques or due to cost. A variety of ferrite tiles of various sizes therefore are used to form bars 118 or other ferrite configurations.

FIG. 1 further includes a housing 110 configured to house, for example at least the coil 108, the ferrite 116 and also the shield 120. The housing 110 may be made of any suitable material (e.g., hard plastic, ceramics etc.) and can be designed to provide structural support for example to support the weight of various vehicles objects that may pass over the housing 110. In some implementations the housing 110 may be made of a non-conductive material to avoid interfering or interacting with the magnetic field 112. As mentioned above, in some cases foreign objects (e.g., objects such as metal or other objects that may interact with the magnetic field) may rest on the surface of the housing 110 as will be further elaborated on below. All or just a portion of the power conversion circuit 104 may also be housed in the housing 110. Although in some implementations the power conversion circuit 104 may be housed separately from the housing 110 that houses the power transfer structure 106. In some cases, the power conversion circuit 104 is housed in the housing 110 but is positioned on the other side of the shield 120 from the ferrite 116.

Figure 1B:
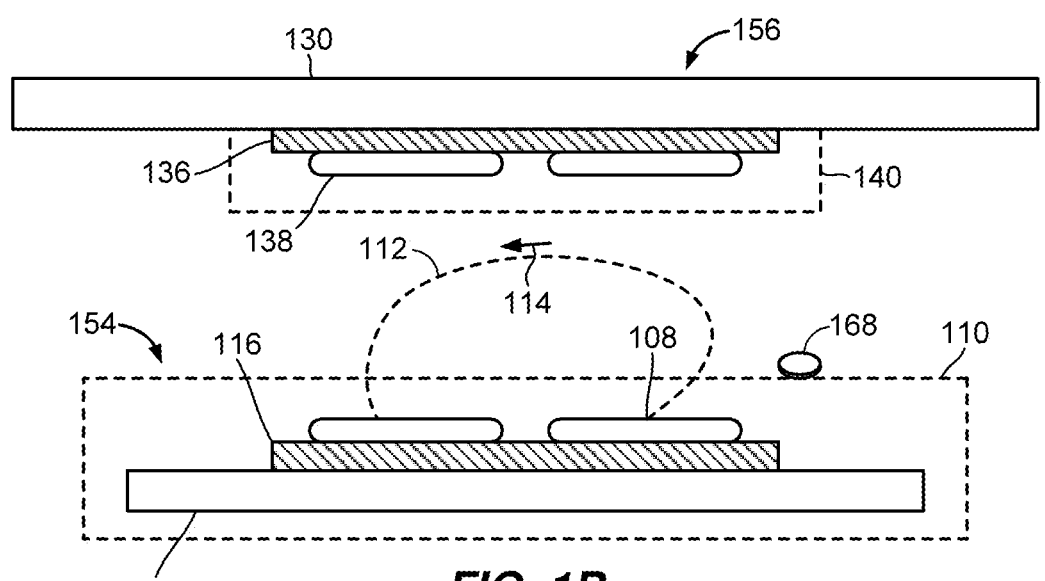
FIG. 1B illustrates a side view of a wireless power transfer system that includes a wireless power transmit circuit and a wireless power receive circuit.

FIG. 1B illustrates a side view of a wireless power transfer system 150 that includes a wireless power transmit circuit 154 and a wireless power receive circuit 156. The wireless power transmit circuit 154 and a wireless power receive circuit 156 are both examples of the wireless power transfer circuit 102 of FIG. 1. The wireless power transmit circuit 154 includes a shield 120, a layer of ferrite 116 and a transmit coil 108. A housing 110 configured to house the transmit coil 108, ferrite 116, and shield 120 may be provided. In some implementations the shield 120 may form a portion of the housing. There may be a distance between the top surface of the housing and the coil 108. This distance may further allow for some control or at least reduction of flux right at the surface of the housing 110. The power conversion circuit 104 of the wireless power transmit circuit 154 is not shown but may be electrically connected to the wireless power transmit circuit 154 or a portion or all may also be housed in the housing 110.

The wireless power receive circuit 156 includes a receive coil 138 (e.g., configured as a DD topology as described above), a layer of ferrite 136, and a shield 130. As described above, in some implementations the shield 130 may be formed from a portion of the apparatus that the ferrite 136 and receive coil 138 are affixed to (e.g., the metallic underbody of a vehicle). In this case a housing 140 configured to house the receive coil 138 and ferrite 136 is provided but that would not house the shield 130. However other implementations are possible where a shield 130 is included in the housing 140. The power conversion circuit 104 of the wireless power receive circuit 156 is not shown but may be electrically connected to the wireless power receive circuit 156 or a portion or all may also be housed in the housing 140.

The wireless power transmit circuit 154 is configured to generate a magnetic field 112. The wireless power receive circuit 156 is configured to inductively receive power via the magnetic field 112. Magnetic flux 114 may be at a particular level at the surface of the pad (and in some cases may be somewhat higher at or in proximity to the surface of the housing 110 relative to surrounding areas as the surface of the housing 110 is closer to the coil 108). Furthermore, as the wireless power transmit circuit 154 may be positioned on a ground or other top facing surface, an object 168 may come to rest of the surface of the housing 110.

Figure 2:
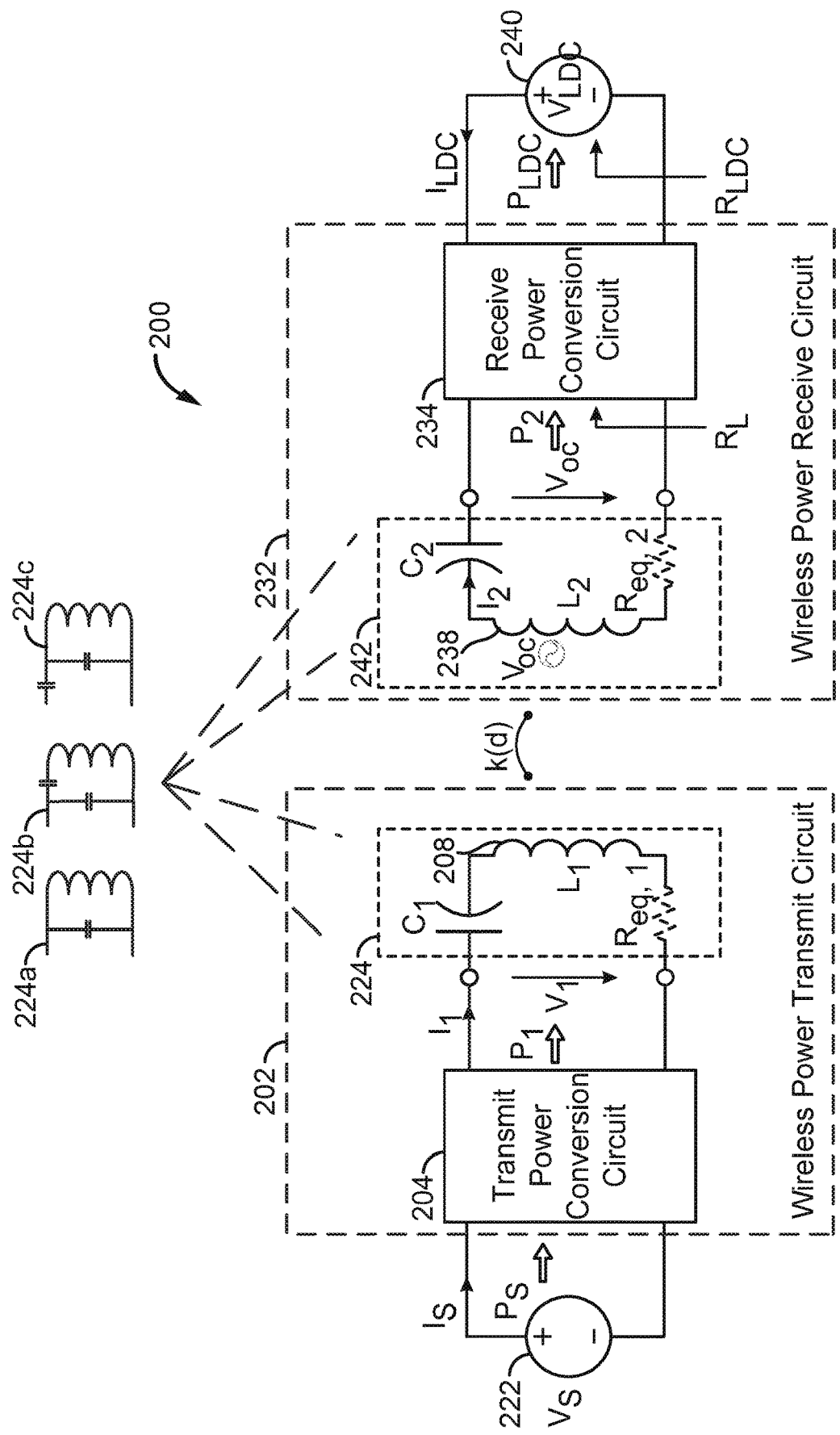
FIG. 2 is a schematic diagram of an example implementation of the wireless power transfer system of FIG. 1B.

FIG. 2 is a schematic diagram of an example implementation of the wireless power transfer system 150 of FIG. 1B. The wireless power transfer system 200 of FIG. 2 includes a wireless power transmit circuit 202 (generally corresponding to the wireless power transmit circuit 154 of FIG. 1B while certain components such as the ferrite 116 are not schematically depicted). The wireless power transmit circuit includes a transmit resonant circuit 224 including a transmit coil 208 having an inductance L1.

The wireless power transfer system 200 further includes a wireless power receive circuit 232 (generally corresponding to the wireless power receive circuit 156 of FIG. 1B while certain components such as the ferrite 116 are not schematically depicted). The wireless power receive circuit 232 includes a receive resonant circuit 242 including a receive coil 238 having an inductance L2. Implementations described herein may use capacitively loaded conductor loops (i.e., multi-turn coils) forming a resonant structure that is capable of more efficiently coupling energy from a primary structure (transmitter) to a secondary structure (receiver) via a magnetic or electromagnetic near-field (e.g., where both the transmit resonant circuit 224 and the receive resonant circuit 242 are tuned to a common resonant frequency).

Using resonant structures for coupling energy may be referred to as "magnetically coupled resonance," "electromagnetically coupled resonance," and/or "resonant induction." The operation of the wireless power transfer system 200 is described based on power transfer from a transmit coil 208 to a receive coil 238, but is not limited thereto. For example, as discussed above, energy may be also transferred in the reverse direction.

With reference to FIG. 2, a power supply 222 (e.g., AC or DC) supplies power $P_S$ to the transmit power conversion circuit 204. The transmit power conversion circuit 204 may include circuitry such as an AC-to-DC converter configured to convert power from standard mains AC to DC power at a suitable voltage level, and a DC-to-AC frequency converter (e.g., inverter amongst other circuitry) configured to convert DC power to power at an operating frequency suitable for wireless high power transfer (e.g., 85 kHz but other operating frequencies are possible). The transmit power conversion circuit 204 supplies power P1 to the transmit resonant circuit 224 that includes a tuning capacitor C1 in series with transmit coil 208 (forming an inductor) to emit/generate a magnetic field at the operating frequency. An electrical current in the transmit coil 208 is represented by $I_1$ and a voltage across the transmit coil 208 is represented by $V_1$.

While the transmit resonant circuit 224 is shown as series-tuned this should be considered as just one example. Resonant circuits 224a, 224b, and 224c provide just a few examples of other resonant topologies. For example, the capacitor C1 may be electrically connected to the transmit coil 208 in parallel as shown by resonant circuit 224a. In yet other implementations, tuning may be formed of several reactive elements in any combination of parallel or series topology. For example, a first capacitor may be coupled in series with the transmit coil 208 and a second capacitor may be connected in parallel with the first capacitor and the transmit coil 208 as shown by resonant circuit 224b. In another example, a first capacitor is electrically connected in parallel with the transmit coil 208 and a second capacitor is electrically connected to the combination of the first capacitor and transmit coil 208 as shown by resonant circuit 224c. Other implementations may use further reactive components such as further capacitors or additional inductors (e.g., for filtering/matching and other purposes to form other topologies—e.g., LCL etc.). The transmit resonant circuit 224 formed by capacitor C1 and transmit coil 208 forms a resonant circuit that resonates substantially at the operating frequency. The transmit coil 208 receives the power $P_1$ (e.g., AC current is driven into the transmit coil 208) and wirelessly transmits power at a level sufficient to charge or power a load connected to the wireless power receive circuit 232. For example, the level of power provided wirelessly by the transmit coil 208 may be on the order of kilowatts (kW) (e.g., anywhere from 1 kW to 110 kW, although actual levels may be or higher or lower).

The receive coil 238 may be positioned within the near-field of the transmit coil 208. In this case, the transmit coil 208 and the receive coil 238 may become wirelessly coupled (e.g., via a magnetic field) to one another such that power may be transferred wirelessly from the transmit coil 208 to the receive coil 238. The series capacitor C2 may be provided to form a receive resonant circuit 242 with the receive coil 238 having an inductance $L_2$ that resonates substantially at the operating frequency. The series-tuned receive resonant circuit 242 should be construed as being exemplary and other resonant topologies may be used similarly as described with the receive resonant circuit 224 (e.g., with respect to resonant circuits 224a, 224b, and 224c to form any combination of parallel or series topology). Element k(d) represents the mutual coupling coefficient resulting at coil separation d. Equivalent resistances Req,1 and Req,2 represent the losses that may be inherent to the transmit coil 208 and the receive coil 238 and the tuning (anti-reactance) capacitors C1 and C2, respectively. The receive resonant circuit 242 receives and provides the power P2 to a receive power conversion circuit 234 of the wireless power receive circuit 232. The voltage induced across the receive coil 238 is represented as an alternating voltage source $V_{OC}$. Electrical current in the receive coil 238 is represented by $I_2$.

The receive power conversion circuit 234 may include, among other things, an AC-to-DC converter (e.g., rectifier amongst other circuitry such as other power regulation or DC-DC conversion and current regulation circuitry for regulating the current $I_2$ in the receive coil 238) configured to convert power at an operating frequency back to DC power at a voltage level of the load 240 that may represent a battery unit. The receive power conversion circuit 234 provides the converted power $P_{LDC}$ to the load 240.

In some implementations, the wireless power transfer system 200 may also be configured to provide power wirelessly through the receive coil 238 to the transmit coil 208 to feed power back to the grid. Each of the transmit coil 208 and the receive coil 238 may act as transmit or receive coils based on the mode of operation.

The transmit power conversion circuit 204 and/or the transmit resonant circuit 224 may further includes other matching and/or filter circuitry configured to match impedances between the transmit resonant circuit 224 and the transmit power conversion circuit 204 and provide other filter functions. Other amplifiers/oscillators and other circuitry for driving the transmit coil 208 with the appropriate current/voltage is also contemplated. Likewise, the receive power conversion circuit 234 and/or the receive resonant circuit 242 can also include similar matching and/or filter circuitry. In addition, other circuitry may be included in the receive power conversion circuit 234 may further be provided for conditioning or regulating power for suitable use at the load 240.

While the term "coil" is used above, the transmit coil 208 and the receive coil 238 may also correspond to other forms of power transfer elements. As such, the term "coil" is intended to refer to a component that may wirelessly output or receive energy for coupling to another "coil." However, in particular exemplary implementations the transmit coil 208 and the receive coil 238 are configured as coils of wire (e.g., Litz wire) and be configured as "conductor loops", and more specifically, "multi-turn conductor loops."

As described above, according to some implementations, coupling power between the transmit coil 208 and the receive coil 238 that are in the near-field of one another is disclosed. The near-field may correspond to a region around the coil in which mainly reactive electromagnetic fields exist. Nevertheless, "electric" couplers (e.g., dipoles and monopoles) or a combination of magnetic and electric couplers may possibly be used.

With reference to FIG. 1B, and as mentioned above, metal objects—see object 168 (or other objects that interact with the magnetic field 112) may naturally come to rest on the surface of the housing 110 of the wireless power transmit circuit 154. Magnetic flux densities at the surface of the housing 110 can be at relatively high levels to allow for sufficient power transfer (e.g., for a wireless electric vehicle charging system (WEVC) power may be transferred on the order of kilowatts—e.g., 3.3 kW, 11 kW, and the like). For this reason, foreign object detection (FOD) may be implemented to these objects. However, foreign object detection systems, may be complicated or costly when they are configured to be sufficiently sensitive to detect all foreign objects of all sizes affected by the magnetic field including very small objects such as paper clips and the like.

The degree a metal object 168 is heated in the presence of the magnetic field 112 is related to the level of magnetic flux at the surface of the housing 110. If the level of magnetic flux at the surface of the housing 110 is kept below a certain level or threshold, then heating in certain metal objects may not rise above undesirable levels such that it may be sufficient to allow the object to be present while charging (i.e., either no need to detect the object or refrain from adjusting power based on the presence of the object). For example, if the temperature of an object 168 such as a paper clip stays below 300 degrees Celsius (C), the object may avoid ignition and therefore be less of a potential hazard. If the level of magnetic flux is above some threshold, then over a period of several minutes the ignition temperature may be exceeded. However, if the magnetic flux at the surface of the housing 110 is kept below a certain level/threshold the object 168 may never exceed a critical temperature point (e.g., of ignition). As one example for certain objects, if the magnetic flux density at the surface of the housing is above 3 millitesla (mT) then over some period of time certain small objects may approach or exceed an ignition temperature. However, if the magnetic flux density at the surface of the housing is kept below a threshold such as around 2 mT (other values such under 3 mT in some cases may also be possible depending on the application), then it may be much less likely that an object approaches a critical temperature (e.g., 300 degrees C.).

If the magnetic flux density is therefore kept below a threshold such that the temperature of objects are prevented from approaching a critical temperature threshold while power is being transferred, the foreign object detection circuitry may be simplified (e.g., may be designed in a way in some cases where certain objects may not always be detected under all circumstances). As such, less complicated or less costly foreign object detection circuitry might be used. This may significantly reduce the overall cost/complexity of the wireless power transfer system 150. For example, the foreign object detection circuitry might be adapted to detect larger objects (e.g., larger than coins or paper clips such as aluminum cans or metal plates) which may require much less sensitivity and less costly solutions may be possible (e.g., based on lost power or power budget analysis).

In certain implementations the wireless power transmit circuit 154 may be designed to be configured to not exceed a certain magnetic flux density at a surface of the housing 110.

Figure 3A:
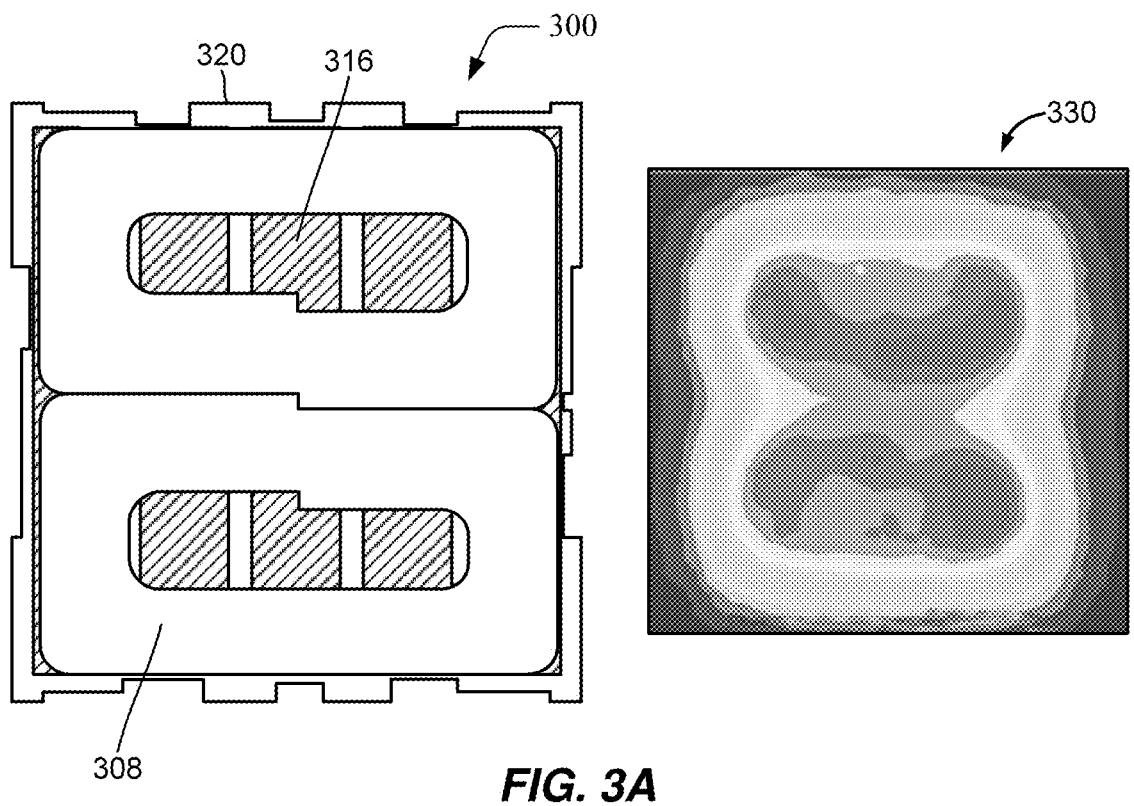
FIG. 3A illustrates a wireless power transmit circuit that is configured to have reduced magnetic flux densities at the surface.

FIG. 3A illustrates a wireless power transmit circuit 300 that is configured to have reduced magnetic flux densities at the surface. FIG. 3A illustrates the shield 320, the ferrite 316 and the transmit coil 308 of the wireless power transmit circuit 300. A number of design aspects of the wireless power transmit circuit 300 can be configured to cause the magnetic flux density at the surface to be maintained below a threshold for certain power outputs. For example, the number of windings of the transmit coil 308, the width of the coil 308, the configuration, shape, or amount of the ferrite 316, the size of the openings of the transmit coil 308, the configuration/shape of the shield 320 and other aspects and operations of the power conversion circuit 104 (FIG. 1) may be configured such that the magnetic flux density at the surface is maintained below a threshold. As illustrated in the plot 330, for the configuration shown by the wireless power transmit circuit 300, magnetic flux densities are maintained generally at or below 2 mT when no wireless power receive circuit is positioned within the region of the field generated by the wireless power transmit circuit 300. Stated another way the peak magnetic flux level is at or below 2 mT. It should be appreciated that these values are meant to be illustrative only and are non-limiting and other peak values may be contemplated for higher power outputs or for different configurations.

Figure 3B:
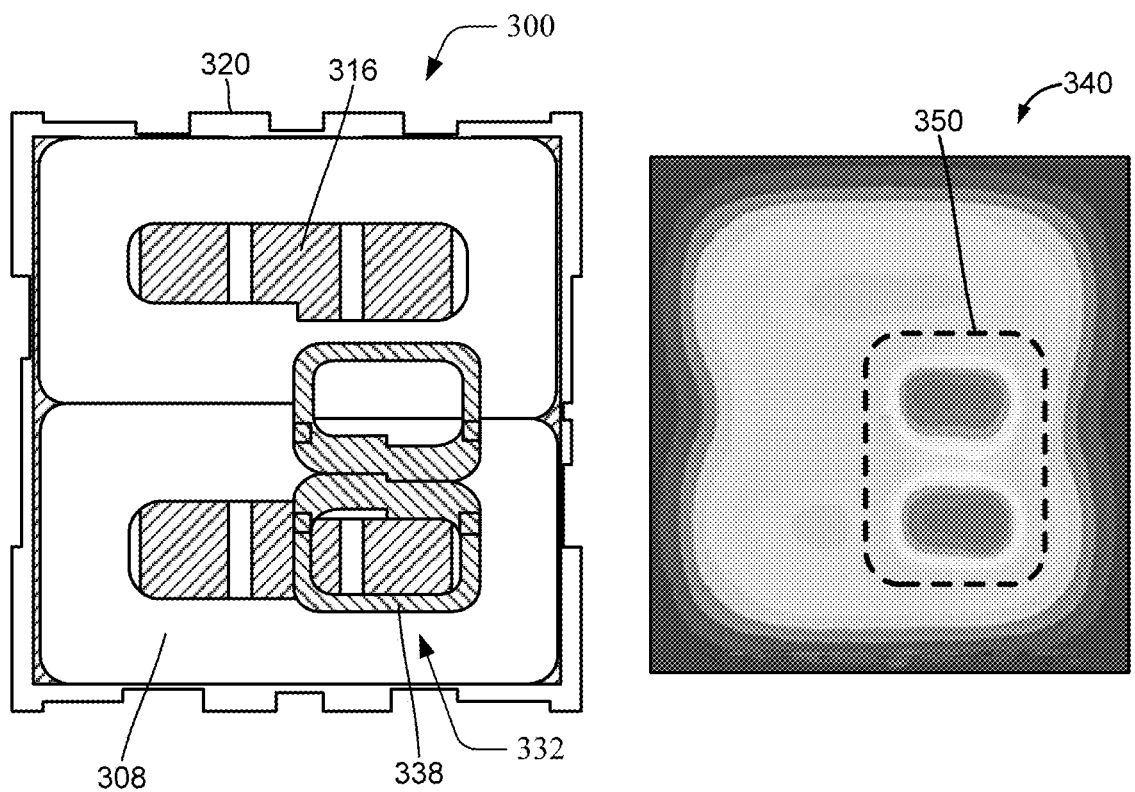
FIG. 3B illustrates the wireless power transmit circuit of FIG. 3A but with a wireless power receive circuit positioned over the wireless power transmit circuit.

FIG. 3B illustrates the wireless power transmit circuit 300 of FIG. 3A but with a wireless power receive circuit 332 (illustrated by the receive coil 338 for facilitating the view but the other components such as ferrite/shielding may also be present) positioned over the wireless power transmit circuit 300 at a particular height over the transmit coil 308. The presence of the wireless power receive circuit 332 may have a significant impact on the peak magnetic flux levels at the surface of the wireless power transmit circuit 300. For example, when the wireless power receive circuit 332 is positioned over the wireless power transmit circuit 300, particularly at closer distances, the magnetic field distribution may change due to the distance between the structures reducing the flux impedance path directly underneath the wireless power receive circuit 332. This creates a concentration of flux under the wireless power receive circuit 332 (e.g., under the receive coil 338). These peak levels of magnetic flux on the surface of the wireless power transmit circuit 300 may therefore rise above a particular targeted threshold (e.g., 2 mT) due to the presence of the wireless power receive circuit 332. This is illustrated by the plot 340 of FIG. 3B which shows an area 350 of peak magnetic flux that has values on the order of 4 mT and which area 350 corresponds to the position of the wireless power receive circuit 332. This peak level of 4 mT caused by the presence of the wireless power receive circuit 332 is higher than the peak level of 2 mT shown by FIG. 3A for the same configuration of the wireless power transmit circuit 300. This may be undesirable when trying to maintain the magnetic flux level at the surface below a threshold.

Furthermore, the particular area on the transmit coil 308 where the peak level magnetic flux occurs may also therefore change due to the particular position/height of the wireless power receive circuit 332 which may be at different alignment positions. It is noted that the peak level may not always be positioned where the receive coil 338 and the transmit coil 308 overlap (e.g., directly under receive coil 338). For example, when the wireless power receive circuit 332 is further away the transmit coil 308 (e.g., vertically spaced higher from the transmit coil 308) the peak magnetic flux level may be at a different location on the transmit coil 308. However, the peak magnetic flux level may still be impacted by the presence of the wireless power receive circuit 332 in this situation.

Aspects of implementations described herein include techniques for estimating or measuring changes in peak magnetic flux levels in different scenarios based on the influence of the wireless power receive circuit 332 to the overall flux density over the wireless power transmit circuit 300. The estimated or measured changes in peak magnetic flux levels are used to adjust currents in the coils to reduce the flux density while maintaining sufficient power transfer.

FIGS. 4A and 4B are plots that further illustrate the influence of the wireless power receive circuit 156 to the overall flux density on the surface of a housing 110 of the wireless power transmit circuit 154 and relationship between coil currents. The discussion of the plots is made with reference to FIG. 1B. Plots 400a and 400b illustrate currents and magnetic flux levels at a particular height Z3 of the receive coil 138 over the transmit coil 108. Plots 400c and 400d illustrate currents and magnetic flux levels at another particular height Z1 of the receive coil 138 over the transmit coil 108. Z1 is smaller than Z3 such that there is less distances between the receive coil 138 and the transmit coil 108 for Z1 than for Z3.

Plot 400a shows the current in the transmit coil 108—$I_1$—and the current in the receive coil 138—$I_2$—for various alignment positions of receive coil 138 at the Z3 height over the transmit coil 108. Plot 400b shows the peak magnetic flux levels (B_max(T)) for a variety of different measurements A, B, C, D, and E corresponding to measurements at various heights or planes above the transmit coil 108 at the various alignment positions shown in plot 400a with the receive coil 138 at the Z3 height over the transmit coil 108. The measurement E generally corresponds to the levels shown in FIGS. 3A and 3B. The Z3 height may be sufficiently large such that the distance between the coils causes little influence of the magnetic flux levels at the surface of the housing 110 of the wireless power transmit circuit 154. As shown, the peak magnetic flux levels are proportional to the current $I_1$ of the transmit coil 108 for all positions of the receive coil 138 (e.g., plot shows that the peak flux levels track the corresponding $I_1$ current levels for each position of the receive coil 138). This is because the receive coil 108 (and current $I_2$ in the receive coil) has little influence on the peak magnetic flux and therefore the peak magnetic flux is primarily influenced by the level of current L in the transmit coil 108.

Plot 400c shows the current in the transmit coil 108—$I_1$—and the current in the receive coil 138—$I_2$—for various alignment positions of receive coil 138 at the Z1 height over the transmit coil 108 which is less than Z3. Plot 400d shows the peak magnetic flux levels (B_max(T)) for a variety of different measurements A, B, C, D, and E corresponding to measurements at various heights or planes above the transmit coil 108 at the various alignment positions shown in plot 400a with the receive coil 138 at the Z1 height over the transmit coil 108. In this situation the receive coil 138 (and current $I_2$ in the receive coil 138) has a much greater influence on the peak magnetic flux level. As is shown for the Z1 height for certain positions of the receive coil 138 the peak magnetic flux level is proportional to the current $I_1$ of the transmit coil 108. However, as the alignment position gets greater and the peak magnetic flux goes above a threshold (e.g., 3.5 mT), then peak magnetic flux levels no longer are proportional (e.g., no longer track the current $I_1$ of the transmit coil 108). Rather, a combination of the current $I_1$ of the transmit coil 108 and current $I_2$ of the receive coil 138 contribute to the peak magnetic flux level (e.g., the receive coil 108 is now a much greater influence on the peak magnetic flux level).

In accordance with aspects described herein, the currents $I_1$ and $I_2$ in the transmit coil 108 and the receive coil 138 may be adjusted alone or in combination to achieve maintain a particular output but that also reduces the influence of the receive coil 138 on the peak magnetic flux level to reduce the overall peak magnetic flux level.

Figure 5:
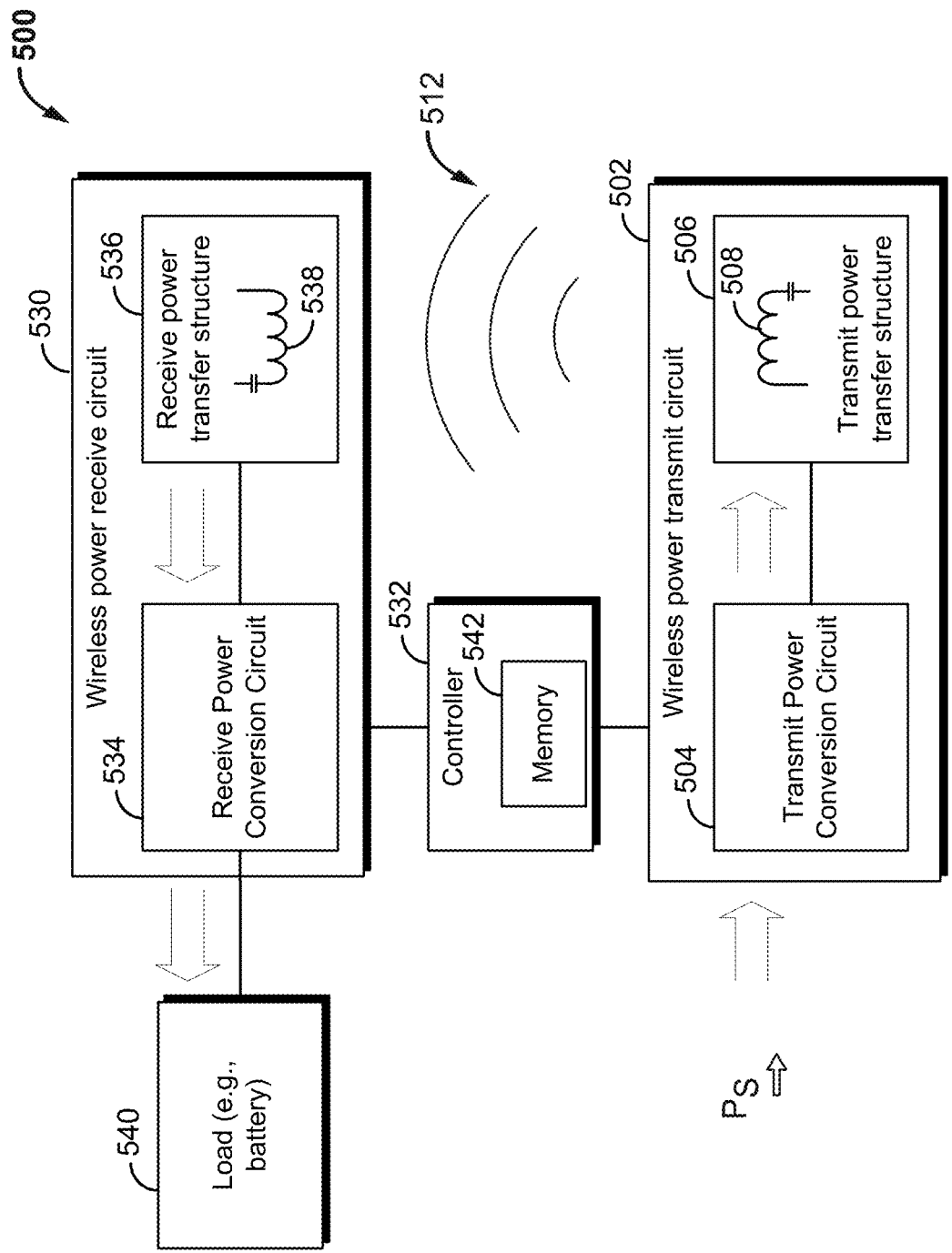
FIG. 5 is a functional block diagram of an example implementation of a wireless power transfer system for reducing magnetic flux density proximate to a wireless power transmit circuit.

FIG. 5 is a functional block diagram of an example implementation of a wireless power transfer system 500 for reducing magnetic flux density proximate to a wireless power transmit circuit 502 (e.g., at a surface of a housing 110 not shown in FIG. 5 but as illustrated in FIG. 1B). The wireless power transfer system 500 includes a wireless power transmit circuit 502 and a wireless power receive circuit 530. The wireless power transmit circuit 502 includes a transmit power conversion circuit 504 operatively connected to a transmit power transfer structure 506 having a transmit coil 508. While not depicted in the functional block diagram of FIG. 4, a housing 110 depicted by FIG. 1, 1B is also contemplated and that is configured to house at least the transmit coil 508. The housing 110 of FIG. 1, 1B may be referred to below in reference to FIG. 5 and subsequent figures. Example implementations for each of these elements has been described with reference to FIGS. 1, 1A, 1B, and 2 and each may be configured as such. As described above, the wireless power transmit circuit 502 is configured to receive input power $P_S$ from a power source and the transmit coil 508 is configured to inductively transfer power to a receive coil 538 of the wireless power receive circuit 530 via a magnetic field 512. The transmit power conversion circuit 504 is configured to cause an electrical current $I_1$ to flow in the transmit coil 508 and control an electrical current level of the electrical current $I_1$ in the transmit coil 508 to adjust power levels and/or other characteristics of the wireless power transfer.

The wireless power receive circuit 530 also includes a receive power transfer structure 536 having the receive coil 538. The receive power transfer structure 536 is operatively connected to a receive power conversion circuit 534. Example implementations for each of these elements has been described with reference to FIGS. 1, 1A, 1B, and 2 and each may be configured as such. The wireless power receive circuit 530 is configured to inductively receive power via the magnetic field 512 using the receive coil 538 and provide converted power at a suitable level for use or charging by the load 540 (e.g., battery). The receive power conversion circuit 534 is configured to convert power receive and also is configured to control an electrical current level of an electrical current $I_2$ that flows in the receive coil 538 to adjust power levels and/or other characteristics of the wireless power transfer. For example, the receive power conversion circuit 534 may be configured to change the effective voltage presented to receive coil 538 and thereby change the level of current flowing through the receive coil 538 (e.g., via any type of receive side control (e.g., current doubler, fast switch controller, synchronous rectifier, additional DC-DC conversion, or the like that alone or in combination allow for changing the effective voltage presented to the receive coil 538 to adjust the level of current flowing through the receive coil 538)).

The wireless power transfer system 500 further includes a controller 532 that operatively connected to at least one or both of the wireless power receive circuit 530 or the wireless power transmit circuit 502. The controller 532 is configured to control one or more aspects of the wireless power receive circuit 530 and/or the wireless power transmit circuit 502 or accomplish other operations relevant to managing the transfer of power. In some implementations the controller 532 may be a part of the wireless power receive circuit 530. In other implementations the controller 532 may be part of the wireless power transmit circuit 502. In other implementations the control is shared such that portions of the functionality of the controller 532 is both a part of the wireless power receive circuit 530 and a part of the wireless power transmit circuit 502. The controller 532 for example may be configured to cause the wireless power receive circuit 530 and/or the wireless power transmit circuit 502 to adjust the level of electrical current in the transmit coil 508 or the receive coil 538 (e.g., by one or more control signals to the transmit power conversion circuit 504 or the receive power conversion circuit 534).

The controller 532 may be a micro-controller or a processor. The controller 532 may be implemented as an application-specific integrated circuit (ASIC), and field programmable gate array (FPGA) device, or other processor device. The controller 532 may be operably connected, directly or indirectly, to each component of the wireless power receive circuit 530 and/or the wireless power transmit circuit 502. The controller 532 may be further configured to receive information from each of the components of the wireless power receive circuit 530 and/or the wireless power transmit circuit 502 and perform calculations based on the received information. The controller 532 may be configured to generate control signals for each of the components that may adjust the operation of that component. The controller 532 further includes a memory 542 configured to store data, for example, such as instructions for causing the controller 532 to perform particular functions, such as those related to management of wireless power transfer and those described in the example operations and methods herein. While the memory 542 is not explicitly depicted in subsequent figures, each of the controllers described below may include a memory 542 configured as described herein with respect to FIG. 5.

In accordance with aspects described herein, the controller 532 is configured determine peak magnetic flux levels in different scenarios (e.g., different alignments of the transmit coil 508 relative to the receive coil 538 and different differences in height between the transmit coil 508 and the receive coil 538). Using this information, electrical current levels for currents $I_1$ and $I_2$ in the transmit coil 508 and the receive coil 538 respectively can be determined that can reduce the peak magnetic flux level (e.g., below some threshold) while still maintaining power output above some level. In this way the magnetic flux levels are maintained at levels that may allow objects to remain in the magnetic field 512 during power transfer without temperatures in the objects rising above undesirable levels.

Particularly the voltage Voc induced at the receive coil 538 (illustrated in FIG. 2) may be represented/determined according to the following equation:

$$V_{OC} = j\omega k\sqrt{L_1 L_2} I_2 \qquad (1)$$

where ω represents the frequency, k represents the coupling coefficient described above, $L_1$ represents the inductance of the transmit coil 508 (shown in FIG. 2), $L_2$ represents the inductance of the receive coil 538 (shown in FIG. 2), and $I_1$ represents the current in the transmit coil 508.

Furthermore, the electrical current $I_2$ in the receive coil 538 (shown in FIG. 2) may be approximated/represented/determined by the following equation:

$$I_2 = j|I_2|\sin(\omega_2 t) \qquad (2)$$

wherein addition to the descriptions above, t is time.

The total power $P_2$ transferred to the receive coil 538 (shown in FIG. 2) may be approximated/represented/determined by the following equation:

$$P_2 = V_{OC} I_2 = \omega k \sqrt{L_1 L_2} I_1 I_2 \qquad (3)$$

The equations can be used to determine different combinations of currents $I_1$ and $I_2$ that result in the same output power. The controller 532 may be configured to determine electrical current level for $I_1$ and $I_2$ that may satisfy a particular output power $P_2$ but where current levels are adjusted to reduce influence of the wireless power receive circuit 530 on the wireless power transmit circuit 502 to reduce peak magnetic flux levels.

In order to determine whether the magnetic flux level is desired to be reduced, the controller 532 may need to determine the peak magnetic flux density or at least some level of magnetic flux at the surface of the housing 110. As described, above the peak magnetic flux density may be at different locations over the transmit coil 508 depending on the height or position of the receive coil 538 relative to the transmit coil 508. The peak magnetic flux level may be different in different operating/alignment conditions and the controller 532 may be configured to determine magnetic flux levels at different locations over the transmit coil 508 at the surface of the housing 110 to be able to determine what the peak magnetic flux level is for different operating/alignment conditions.

Particularly, for controlling and reducing peak magnetic flux density under different scenarios, the controller is configured to receive or determine a measured or estimated magnetic flux level on or outside a surface of a housing 110 (FIG. 1B) configured to house the transmit coil 508. In some aspects, the measured or estimated magnetic flux level may correspond to a magnetic flux level that is at a first location on or outside the surface of the housing 110 where the magnetic flux level at the first location is higher than magnetic flux levels at one or more other locations on or outside the surface of the housing. The measured or estimated magnetic flux level may correspond to the peak magnetic flux level across the surface of the housing 110 configured to house the transmit coil 508. As such the controller 532 is configured to have a mechanism for determining a peak magnetic flux level that may be relative to other lower magnetic flus levels at other regions of the surface of the housing 110 over the transmit coil 508.

In particular scenarios, where a first size of the receive coil 538 is smaller than a second size of the transmit coil 508, the measured or estimated magnetic flux level may correspond to magnetic flux levels at a location where the receive coil 538 overlaps the transmit coil 508 (see e.g., FIG. 3B). Stated another way, in certain scenarios the measured or estimated magnetic flux level is at a point directly under the receive coil 538.

While many examples herein refer to a peak magnetic flux level, it is noted that the measured or estimated magnetic flux level may in some implementations correspond to any level that is sufficient to allow the system to determine that the level of magnetic flux should be adjusted to satisfy some threshold of magnetic flux. For example, the magnetic flux level determined may be any level that may be higher than a magnetic flux threshold or may be some level near the peak magnetic flux level. As such the measured or estimated magnetic flux level that is detected corresponds to a level of flux that may change and that may be at different locations on the transmit coil 508.

The controller 532 is configured to determine an electrical current level for at least one or both of the transmit coil 508 or receive coil 538 that reduces a peak magnetic flux density level in proximity to the transmit coil 508 based on the measured or estimated magnetic flux level at the first location (e.g., and more particularly in one implementation the peak magnetic flux is reduced at the surface of the housing 110. The controller 532 is configured to provide the electrical level to at least one or both of the wireless power receive circuit 530 or the wireless power transmit circuit 502. Each of the wireless power receive circuit 530 and the wireless power transmit circuit 502 are configured to cause adjustment of electrical current in at least one or both of the transmit coil 508 or the receive coil 538 ($I_1$ and/or $I_2$) based on the determined electrical current level. In some implementations the electrical current level is a limit/threshold such that the wireless power receive circuit 530 and/or the wireless power transmit circuit 502 are configured to prevent the currents $I_1$ and/or $I_2$ from going above the limit/threshold.

The controller 532 in some implementations may be configured to determine the electrical current level based further on maintaining a power level of power transferred from the wireless power transmit circuit 502 to the wireless power receive circuit 530. For example, using equation (3) described above the electrical current level for both $I_1$ and/or $I_2$ are determined such that the power output is maintained constant or above a threshold but while adjusting the currents in a way to reduce the peak magnetic flux density.

As such, in accordance with one implementation, the electrical current level may correspond to a first electrical current level $I_1$ for the transmit coil 508 and a second electrical current level $I_2$ for the receive coil 538. In one scenario, the controller 532 is configured to increase the first electrical current level $I_1$ and correspondingly decrease the second electrical current level $I_2$. In this situation overall power transfer may not be as impacted while the adjustment of the current reduces the peak magnetic flux density. In another scenario the controller 532 is configured to decrease the first electrical current level $I_2$ and correspondingly increase the second electrical current level $I_2$. As an example, in one scenario the contribution to the peak magnetic flux level may be in proportions to each of the receive coil 538 and transmit coil 508. In this example, the influence on the peak magnetic flux level may be 33% influenced by the current in the receive coil 538 and 66% influenced by the current in the transmit coil 508. Based on this, the currents may be adjusted to change the influence by each of the transmit coil 508 and receive coil 538 in a manner that reduces the peak magnetic flux level. But each current may be adjusted in a direction to maintain the power output but adjust the corresponding influence to the peak magnetic flux level.

To illustrate relative magnitudes, an exemplary wireless power transfer system 500 may have an input power on the order of 11 kW. The total output power target may be around 8 kW. As such, current in the transmit coil 508 may be on the order of 50 Amps. These values are to illustrate the various levels and are meant to be non-limiting and would change based on an input power and target output power for a particular wireless power transfer system 500.

In accordance, a combination of the current $I_1$ of the transmit coil 508 and the current $I_2$ may be determined by the controller 532 to achieve an optimized output power/magnetic flux compromise. It is noted that the controller 532 may be configured in certain scenarios to lower the total power transferred to achieve the peak magnetic flux reduction desired to maintain the magnetic flux below a threshold. As such, in this scenario, the controller 532 is configured to determine the electrical current level that reduces a total power transferred but also reduces the peak magnetic flux density in proximity to the transmit coil 508. This may occur in situations where efficiency or other considerations cause a desire for lower currents in order to achieve the flux density needed to prevent from heating objects above a critical threshold for extended periods of time.

As will be further illustrated below the controller 532 may be configured as part of a wireless electric vehicle charging system that includes the wireless power transmit circuit 502 and the wireless power receive circuit 530. The load 540 therefore may be a battery of an electric vehicle and power levels may be transferred on the order of kilowatts.

Figure 6:
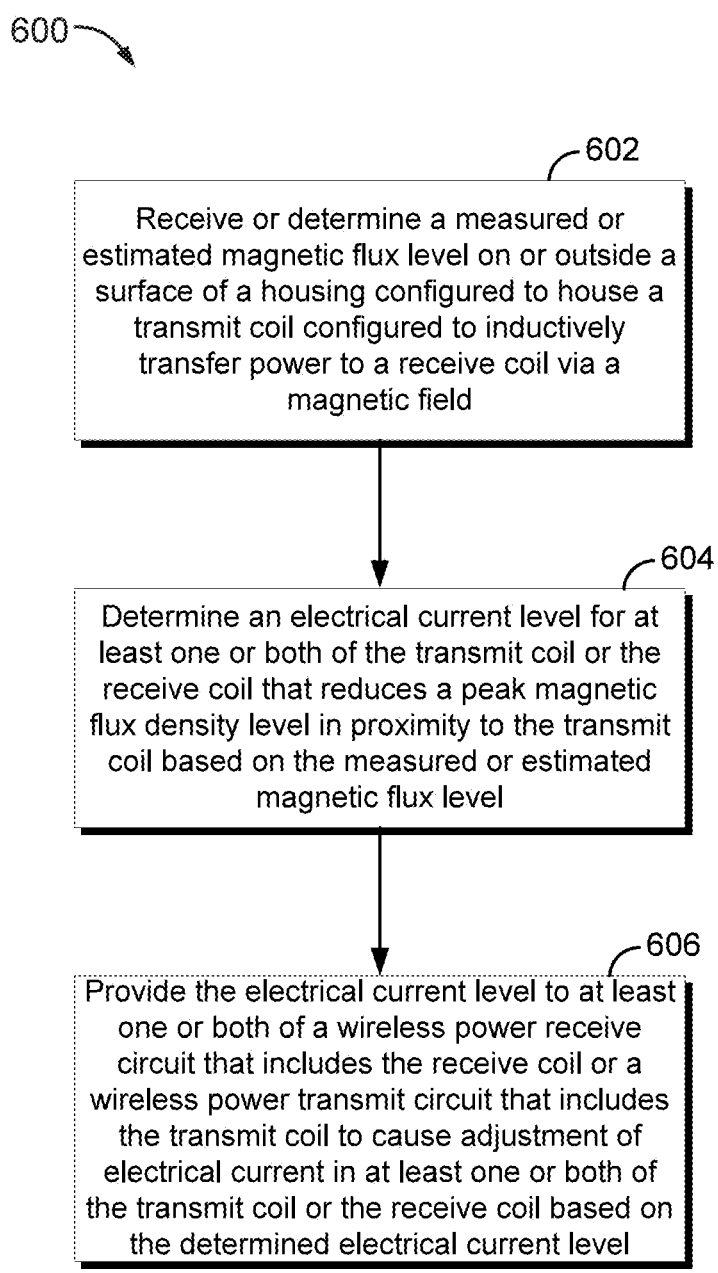
FIG. 6 is a flow diagram of an example of a method for controlling wireless power transfer.

Turning now to a discussion FIG. 6, the following techniques of managing control flux may be implemented using any of the previously described elements of the example environment, components, or circuits. Reference to elements, such as the wireless power receive circuit 530, the controller 532, the wireless power transmit circuit 502 is made by example only and is not intended to limit the ways in which the techniques can be implemented. The depicted sets of operations illustrate a few of the many ways in which the techniques may be implemented. As such, operations of a method may be repeated, combined, separated, omitted, performed in alternate orders, performed concurrently, or used in conjunction other methods illustrated in FIG. 6 and other flowcharts or operations thereof.

FIG. 6 is a flow diagram of an example of a method 600 for controlling wireless power transfer. The method 600 is described with reference to the elements of FIG. 5, however, as noted above, operations described may be performed using any suitable circuitry or component, which may provide means for implementing one or more of the operations.

At operational block 602, the method 600 includes receiving or determining a measured or estimated magnetic flux level on or outside a surface of a housing 110 configured to house a transmit coil 508 configured to inductively transfer power to a receive coil 538 via a magnetic field 512. In some aspects, the measured or estimated magnetic flux level corresponds to a magnetic flux level that is at a first location on or outside the surface of the housing 110 wherein the magnetic flux level at the first location is higher than magnetic flux levels at one or more other locations on or outside the surface of the housing 110. The measured or estimated magnetic flux level may correspond to a peak magnetic flux level on the surface of the housing 110.

At operational block 604, the method 600 further includes determining an electrical current level for at least one or both of the transmit coil 508 or the receive coil 538 that reduces a peak magnetic flux density level in proximity to the transmit coil 508 based on the measured or estimated magnetic flux level. In some implementations, the electrical current level may be a first electrical current level for the transmit coil 508 and a second electrical current level for the receive coil 538. For example, if measured or estimated magnetic flux level exceeds a threshold, then the at least one or both the first or second electrical current levels may be reduced to reduce the peak magnetic flux density level. In some implementations, determining the electrical current level is based further on maintaining a power level of power transferred from the wireless power transmit circuit to the wireless power receive circuit above a threshold. For example, in one scenario determining the electrical current level may include increasing the first electrical current level and correspondingly decreasing the second electrical current level. In another scenario, determining the electrical current level may include decreasing the first electrical current level and correspondingly increasing the second electrical current level.

At operational block 606, the method 600 further includes providing the electrical current level to at least one or both of a wireless power receive circuit 530 that includes the receive coil 538 or a wireless power transmit circuit 502 that includes the transmit coil 508 to cause adjustment of electrical current in at least one or both of the transmit coil 508 or the receive coil 538 based on the determined electrical current level. In some implementations the method 600 includes adjusting electrical current in at least one or both of the transmit coil 508 or the receive coil 538 based on the determined electrical current level.

In accordance with an implementation, the determined or estimated magnetic flux level may be an estimated level that is based on one or more operating conditions. The level may correspond to an estimated peak magnetic flux level as described above. The operating condition may be based on information about the type of receive coil 538 or transmit coil 508 (e.g., the coil topology or configuration), the height of the receive coil 538 above the transmit coil 508, a position/alignment of the receive coil 538 relative to the transmit coil 508, the degree of magnetic coupling between the transmit coil 508 and the receive coil 538, information about materials in the surrounding environment, other environmental conditions (e.g., temperature, etc.), and the like. In particular, in an implementation, alignment/position information may be used to estimate the magnetic flux level at the surface of the housing 110.

Figure 7:
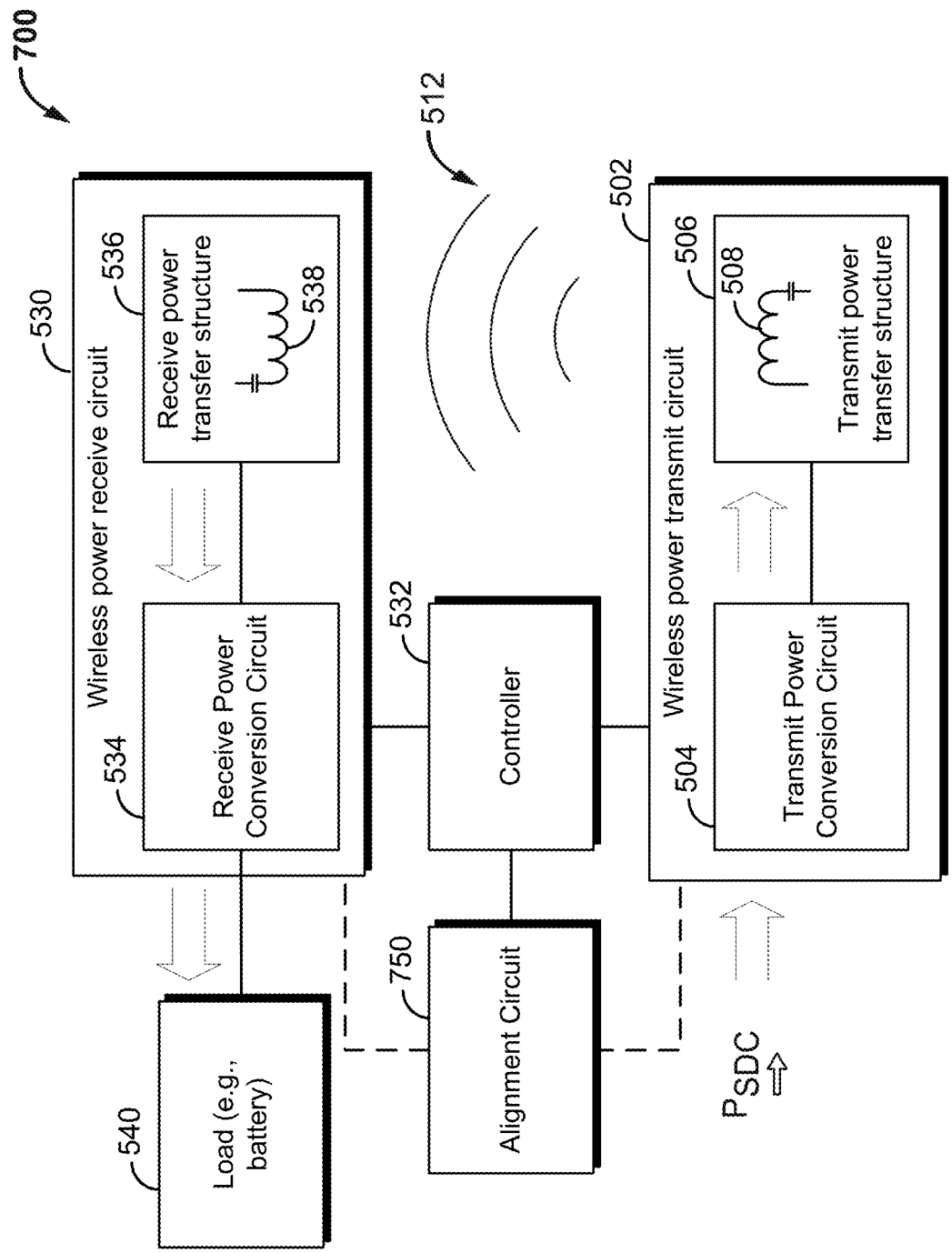
FIG. 7 a functional block diagram of another example implementation of a wireless power transfer system for reducing magnetic flux density.

FIG. 7 a functional block diagram of another example implementation of a wireless power transfer system 700 for reducing magnetic flux density. FIG. 7 includes all the components shown in FIG. 5 in addition to an alignment circuit 750 operatively connected to the controller 532. The alignment circuit 750 may be further operationally connected to the wireless power receive circuit 530 and/or the wireless power transmit circuit 502. The alignment circuit 750 is configured to determine or obtain information indicating a position of the receive coil 538 relative to the transmit coil 508. In some cases, a portion or all of the alignment circuit 750 may be implemented by the controller 532. In some cases, a portion or all of the alignment circuit 750 may be implemented by the wireless power receive circuit 530 and/or the wireless power transmit circuit 502.

A variety of different implementations for obtaining alignment information are contemplated by implementations herein. For example, the alignment circuit 750 may be configured to determine position/alignment information based on injecting lower levels of current and testing magnetic coupling levels between the transmit coil 508 and the receive coil 538. In some implementations the receive coil 538 is driven with a level of current and alignment/position is determined by the alignment circuit 750 based on detecting relative voltages induced at the transmit coil 508 at different locations. In yet other implementations separate circuitry or foreign object detection circuitry can be adapted to detect the position (e.g., a particular object is positioned in the wireless power receive circuit 530 that can be characteristically/uniquely identified as a "special" object associated with the wireless power receive circuit 530 to determine the position of the receive coil 538). Other guidance methods involving separate magnetic beacons/loops, computer vision, signal triangulation, and the like are also contemplated. As such, the alignment circuit 750 may be one or a combination of a variety of techniques for determining alignment/positioning.

Because the receive coil 538 may influence the amount of magnetic flux on the surface of the housing 110, and the amount of influence may be different at different locations, the alignment information may help determine an estimated peak magnetic flux level. As such, in accordance with an implementation, the controller 532 is further configured to receive alignment information (e.g., from the alignment circuit 750) indicating an alignment position of the receive coil 538 relative to the transmit coil 508. The controller 532 is configured to determine the estimated magnetic flux level at the first location based on the alignment information.

In addition, in order to determine the estimated magnetic flux level, the controller 532 may further rely on a measured or estimated magnetic coupling level between the transmit coil 508 and the receive coil 538. Together with the alignment information, the controller 532 is configured to determine the estimated magnetic flux level. In some implementations, the estimated magnetic flux level corresponds to an estimated peak magnetic flux level determined based on the alignment information and the measured or estimated magnetic coupling level. The measured or estimated magnetic coupling level may be determined by the controller 532 based on one or more inputs from the wireless power receive circuit 530 and/or the wireless power transmit circuit 502. Or in some implementations the controller 532 is configured to receive the measured or estimated magnetic coupling level from one of the wireless power receive circuit 530 or the wireless power transmit circuit 502.

In some implementations the controller 532 is configured to determine the measured or estimated magnetic flux level at the first location using a look-up table (e.g., stored in memory 542) that is indexed by the alignment information and the measured or estimated magnetic coupling level. Particularly, beforehand, the system may be measured or simulated for a receive coil 538 at different locations and different heights relative to the transmit coil 508. At each location/height combination, the peak magnetic flux level at the surface of the housing 110 may be determined (and also for various magnetic coupling conditions/levels). This information may be used to build a look-up table indexed by each possible location and coupling level. For example, the estimated or measured coupling level may indicate the particular height of the receive coil 538 relative to the transmit coil 508. Therefore, a look-up table may be indexed by the estimated or measured coupling level and alignment information to determine an estimated magnetic flux level where the look-up table may be based on the prior simulated/measured values for each location.

In another implementation, the controller 532 is configured to determine the measured or estimated magnetic flux level at the first location using a pre-defined function that uses inputs based on the alignment information and the measured or estimated magnetic coupling level. The pre-defined function based on polynomial estimation. For example, data may be generated based on measurements or simulations for different locations and heights as described above with respect to the look-up table. This data can then be analyzed to come up with an equation/function that is derived from the data (e.g., using polynomial regression/curve fitting and the like) and that correlates or defines a relationship between a magnetic flux level to a particular location/coupling combination. As such the function may receive the alignment information and coupling level and output a corresponding estimated magnetic flux level (e.g., that may correspond to a peak magnetic flux level).

In conjunction with FIG. 7 and the method 600 of FIG. 6, in another implementation the method 600 may further include receiving alignment information indicating an alignment position of the receive coil 538 relative to the transmit coil 508. In this case the determining of the measured or estimated magnetic flux of operational block 602 may include determining the measured or estimated magnetic flux level further based on the alignment information. Furthermore, in an implementation determining of the measured or estimated magnetic flux of operational block 602 may include determining the measured or estimated magnetic flux level further based on the alignment information and on a measured or estimated magnetic coupling level. A more particular method for using alignment information to control flux is shown in FIG. 8.

Figure 8:
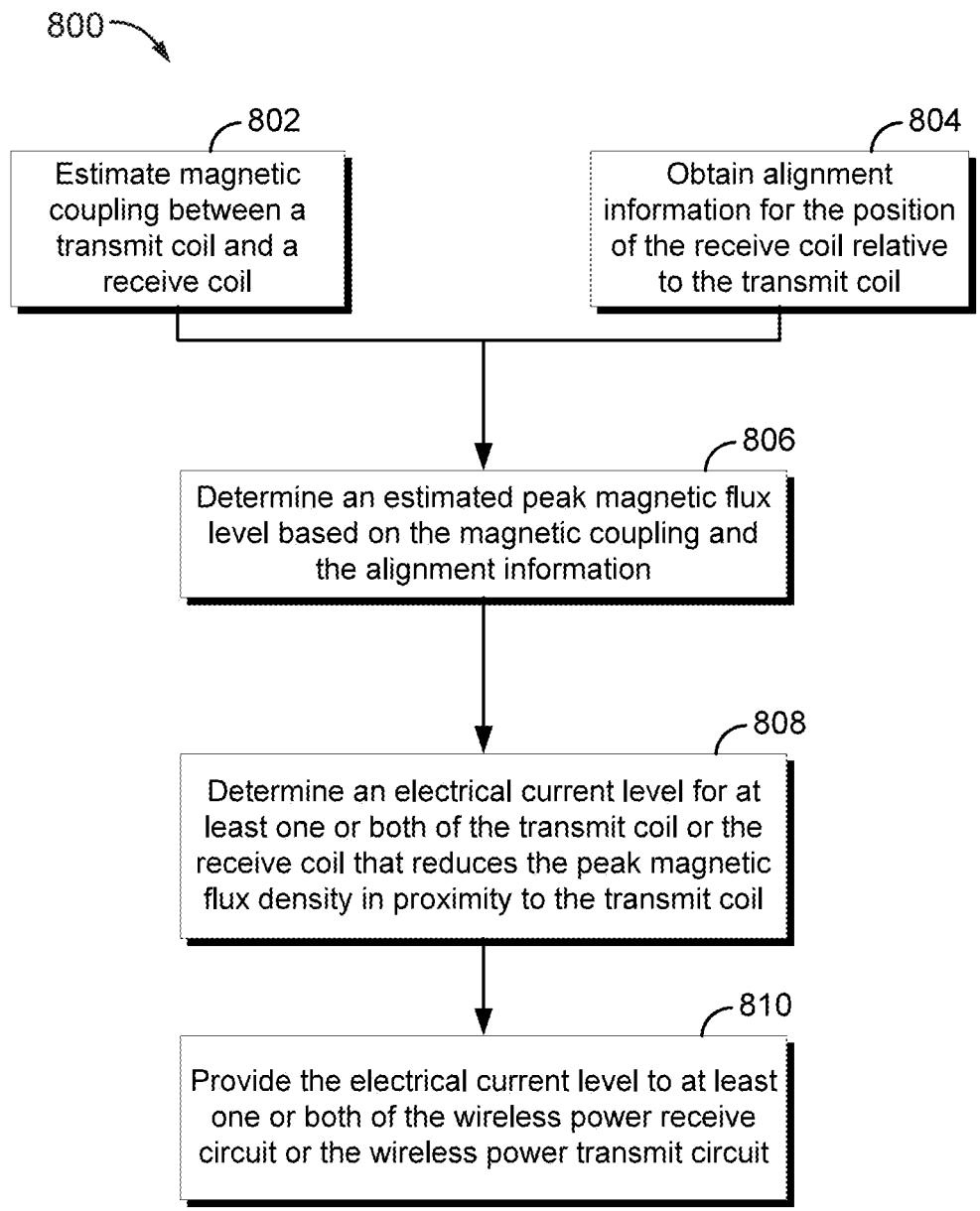
FIG. 8 is a flow diagram of an example of another method for controlling wireless power transfer.

FIG. 8 is a flow diagram of an example of another method 800 for controlling wireless power transfer. The method 800 is described with reference to the elements of FIG. 7, however, as noted above, operations described may be performed using any suitable circuitry or component, which may provide means for implementing one or more of the operations.

At operational block 802, the method 800 includes estimating coupling between a transmit coil 508 and a receive coil 538. For example, the controller 532 may receive one or more inputs (e.g., induced voltage values, current values) from the wireless power receive circuit 530 and/or the wireless power transmit circuit 502 and estimate a level of magnetic coupling.

At operational block 804, the method 800 includes obtaining alignment information for the position of the receive coil 538 relative to the transmit coil 508. For example, the alignment circuit 750 may be configured to determine the alignment information using a variety of techniques (examples of which are described above). The controller 532 may be configured to receive the alignment information from the alignment circuit 750.

At operational block 806, the method includes determining an estimated peak magnetic flux level based on the magnetic coupling and the alignment information. For example, the controller 532 may be configured to use a look-up table or a pre-defined function (e.g., using polynomial estimation) to determine an estimated peak magnetic flux level based on the magnetic coupling and the information. For example, the method 800 can include indexing a look-up table by the alignment information and a measured or estimated coupling level to determine the peak magnetic flux level. In another aspect, the method 800 can include determining an output of a pre-defined function using inputs based on the alignment information and the measured or estimated magnetic coupling level to determine the peak magnetic flux level.

At operational block 808, the method 800 further includes determining an electrical current level for at least one or both of the transmit coil 508 or the receive coil 538 that reduces the peak magnetic flux density in proximity to the transmit coil 508 (and more particularly reduced at the surface of the housing 110). As described above with reference to FIGS. 5 and 6 the electrical current level(s) may be determined to maintain power output above some threshold such that there may be corresponding changes in current in the transmit coil 508 and current in the receive coil 538.

At operational block 810, the method 800 further includes providing the electrical current level to at least one or both of the wireless power receive circuit 530 or the wireless power transmit circuit 502. This may be similar to what was described with reference to FIGS. 5 and 6. In some cases the method 800 further include adjusting current in at least one or both of the wireless power receive circuit 530 or the wireless power transmit circuit 502 based on the electrical current level.

In some implementations, either as an alternative or in combination with information such as alignment information, flux measurements may also be used to determine a peak magnetic flux level. As such flux measurement circuitry may be provided in accordance with implementations described herein. Further, existing circuitry used for other purposes may be re-purposed as flux measurement circuitry.

Figure 9:
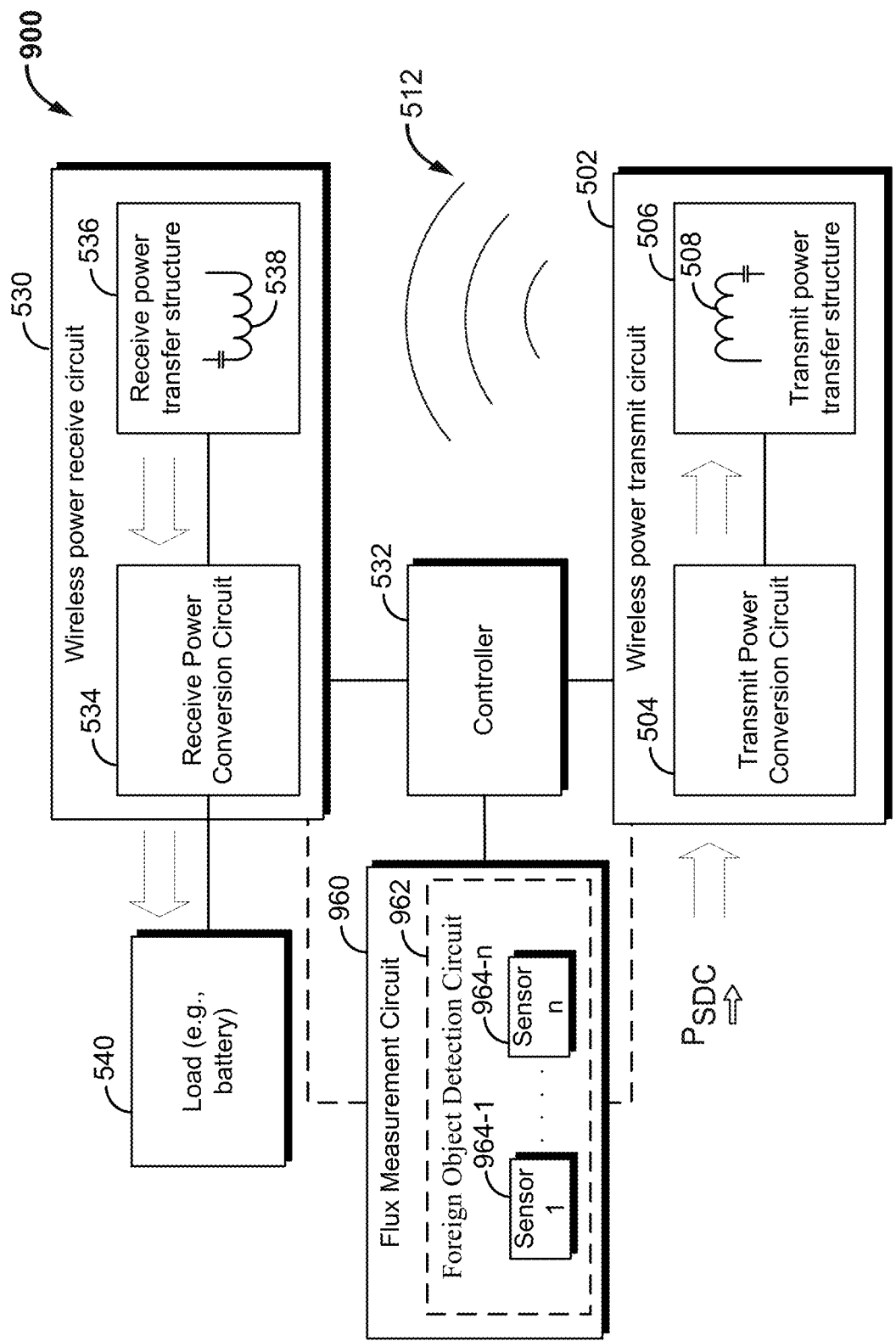
FIG. 9 is a functional block diagram of another example implementation of a wireless power transfer system for reducing magnetic flux density.

FIG. 9 is a functional block diagram of another example implementation of a wireless power transfer system 900 for reducing magnetic flux density. FIG. 9 includes all the components shown in FIG. 5 in addition to a flux measurement circuit 960 operatively connected to the controller. The flux measurement circuit 960 may be further be operationally connected to the wireless power receive circuit 530 and/or the wireless power transmit circuit 502. In some cases, a portion or all of the flux measurement circuit 960 may be implemented by the controller 532. In some cases, a portion or all of the flux measurement circuit 960 may be implemented by the wireless power receive circuit 530 and/or the wireless power transmit circuit 502.

The flux measurement circuit 960 includes a plurality of plurality of magnetic flux sensors 964-1 . . . 964-n. The magnetic flux sensors 964-1 . . . 964-n may be positioned at different points in proximity the to the transmit coil 508. Because of this proximity, in many implementations, the magnetic flux sensors 964-1 . . . 964-n are integrated in the transmit power transfer structure 506. The flux measurement circuit 960 is configured to determine a measured magnetic flux level based on measurements at one or more of the plurality of magnetic flux sensors 964-1 . . . 964-n. This measured magnetic flux level can then be used to determine an electrical current level in at least one or both of the wireless power receive circuit 530 or the wireless power transmit circuit 502 as described above with reference to FIGS. 5 and 6.

The measured magnetic flux level may correspond to a peak magnetic flux level. As such, as the magnetic flux at different magnetic flux sensors 964-1 . . . 964-n may different than one another, a peak magnetic flux level may be determined based on the highest magnetic flux value sensed at the magnetic flux sensors 964-1 . . . 964-n. As such the flux measurement circuit 960 is configured to differentiate between different levels of magnetic flux at different positions in proximity to the transmit coil 508 to determine a peak magnetic flux level.

The magnetic flux sensors 964-1 . . . 964-n may be implemented in different ways and may be any sensor that can sense a level of magnetic flux. For example, the magnetic flux sensors 964-1 . . . 964-n may be implemented as hall effect sensors.

In another implementation, the plurality of magnetic flux sensors 964-1 . . . 964-n may correspond to each of a plurality of conductive loops different from and smaller than the transmit coil 508. In this case the flux measurement circuit 960 is configured to measure a voltage induced at each of the conductive loops by the magnetic field 512 at an operating frequency of the wireless power transmit circuit 502. For example, if the operating frequency is 85 kHz, the flux measurement circuit 960 is configured to determine the induced voltage at each of the conductive loops at 85 kHz. The voltage induced at each of the conductive loops is proportional to the magnetic flux level and therefore may be used to derive a magnetic flux level at each of the loops. The magnetic flux level at one of the plurality of conductive loops that is higher than measured at one or more of the other loops of the plurality of conductive loops may correspond to the measured magnetic flux level (e.g., peak or maximum magnetic flux level) that may be used to adjust current in the transmit coil 508 and/or receive coil 538. In the absence of the receive coil 538 each measured flux value may be at some level when the transmit coil 508 is active. However, when the receive coil 538 is present then due to the influence by the receive coil 538 the magnetic flux measured at each of the magnetic flux sensors 964-1 . . . 964-n may change. As such, in some implementations the flux measurement circuit 960 is configured to detect a change from a predetermined level to determine the presence of the receive coil 538 and determine if current needs to be adjusted.

In some implementations, the magnetic flux sensors 964-1 . . . 964-n may be a part of other existing circuitry in the wireless power transfer system 900 that may be re-purposed for measuring flux. This may save cost while also leveraging existing components for determining accurate levels of magnetic flux based on measurements taken during operation.

For example, the magnetic flux sensors 964-1 . . . 964-n may be part of a foreign object detection circuit 962 that is configured to detect an object (e.g., metal object) on the surface of the housing 110. As such, FIG. 9 shows an optional foreign object detection circuit 962 that might include the magnetic flux sensors 964-1 . . . 964-n that are also used by the flux measurement circuit 960. As such, the flux measurement circuit 960 and the foreign object detection circuit 962 may be combined. As an example, magnetic flux sensors 964-1 . . . 964-n may correspond to conductive loops that may be configured to detect objects based on changes in impedance detected in the conductive loops caused by objects. The conductive loops may be fairly small to be sufficiently sensitive in order to detect smaller metal objects (e.g., paper clips or coins). As such they may be also suited to detect magnetic flux at different locations in proximity to the transmit coil 508 to determine a maximum or peak magnetic flux level based on the highest measured value.

Figure 10A:
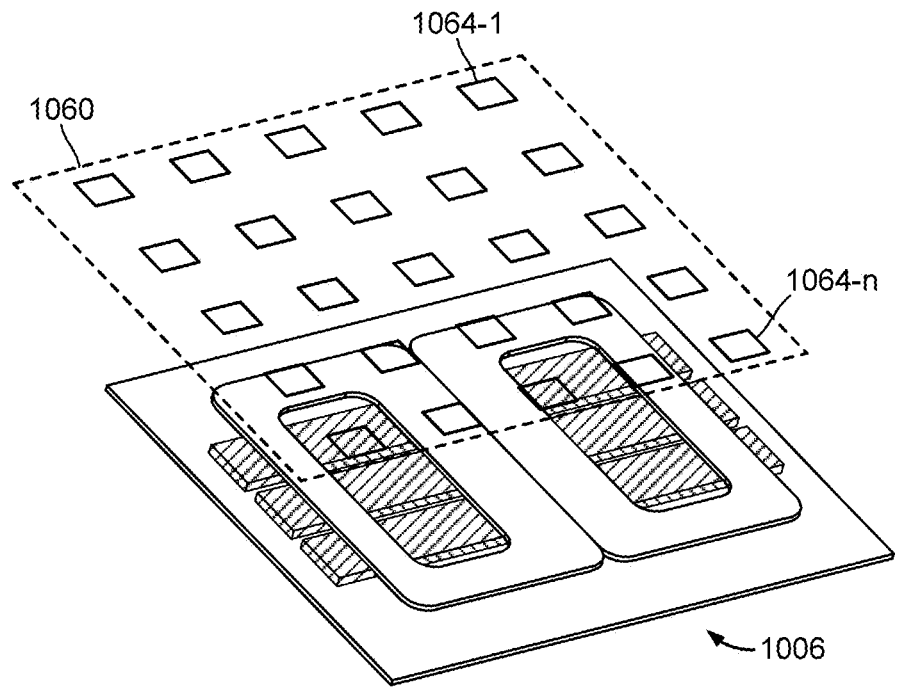
FIGS. 10A and 10B are illustrations of a perspective view and side view of a wireless power transfer structure that includes a flux measurement circuit.
Figure 10B:
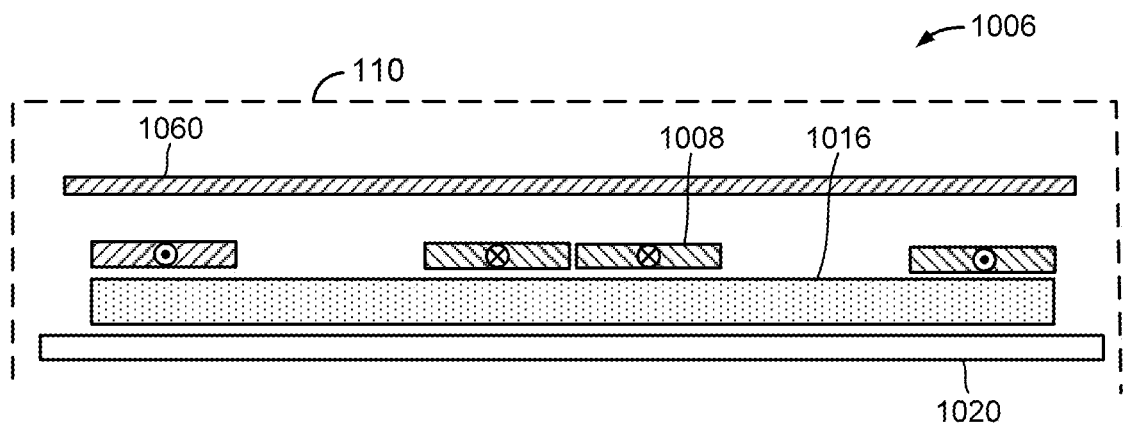

FIGS. 10A and 10B are illustrations of a perspective view and side view of a wireless power transfer structure 1006 that includes a flux measurement circuit 1060. FIGS. 10A and 10B show the structure 1006 as shown in FIG. 1 with the shield 1020, ferrite 1016, and transmit coil 1008 with an additional layer for a flux measurement circuit 1060 that includes of magnetic flux sensors 964-1 . . . 964-n arranged at different positions (e.g., in an array) between the coil 1008 and a top surface (e.g., between the coil and the housing 110. As such, the flux measurement circuit 1060 includes components such as the magnetic flux sensors 964-1 . . . 964-n that are in a layer above the transmit coil 1008. For the purposes of FIGS. 10A and 10B, the magnetic flux sensors 964-1 . . . 964-n may be implemented in a variety of ways (e.g., hall effect sensor or other sensors) or as sensors in a foreign object detection circuit. The location of the sensors that may be close to the surface of the housing 110 may be beneficial in accurately determining the level of magnetic flux at the surface of the housing 110.

When the magnetic flux sensors 964-1 . . . 964-n are part of a foreign object detection circuit 962 it may already be beneficial to have the magnetic flux sensors 964-1 . . . 964-n located close to the surface of the housing 110 since that will be more proximate to objects that are likely to rest of the surface of the housing 110. As such, these magnetic flux sensors 964-1 . . . 964-n may already, based on their foreign object detection function, be positioned at locations ideal for determining magnetic flux at the surface. As shown, the magnetic flux sensors 964-1 . . . 964-n are arranged in a two-dimensional array and are spread over the surface to allow determining magnetic flux levels at multiple locations over the transmit coil 508. The highest measured value may correspond to a peak magnetic flux level and allows for determining electrical current to reduce the peak magnetic flux level.

FIG. 10C illustrates a foreign object detection circuit 962 with a plurality of conductive loops configured to detect an object 1068. The conductive loops may also be used for the magnetic flux sensors 964-1 . . . 964-n. Electrical characteristics of the conductive loops may be measured by a control and measurement circuit 1066. A multiplexer 1062 may be provided to allow using a common control and measurement circuit 1066 for each of the conductive loops by selectively connecting each of the conductive loops to the control and measurement circuit. As described above, in one implementation the control and measurement circuit 1066 is configured to measure an induced voltage (could also be other electrical characteristic such as impedance or current) at each of the conductive loops at the operating frequency of the magnetic field 512. The induced voltage may be proportional to the magnetic flux level and the control and measurement circuit 1066 can then be configured to determine which value is the highest and provide the highest value to the controller 532 for further evaluation as described above.

In the implementation of FIG. 10C, the foreign object detection circuit 962 also is configured to operate in a normal foreign object detection mode. For example, in an implementation, the control and measurement circuit 1066 is configured to drive each of the conductive loops with a signal at a particular detection frequency. The drive signal may be used to sense changes in an impedance at one of the conductive loops in the presence of an object 1068. This signal may be at a different frequency than the operating frequency used for wireless power transfer. For example, the frequency may be on the order of 3 MHz as compared to an exemplary wireless power transfer operating frequency of 85 kHz. In some cases, while in foreign object detection mode there is filter circuitry (separate or a part of the control and measurement circuit 1066) that filters out the 85 kHz components. However, when the control and measurement circuit 1066 is configured to operate in a magnetic flux level detection mode, the control and measurement circuit 1066 (e.g., that is or is a part of the flux measurement detection circuit 1060) may measure an electrical characteristic (e.g., induced voltage) at the operating frequency (e.g., at 85 kHz) in each of the conductive loops without driving any signal because the magnetic field 512 will already present for the wireless power transfer.

When the magnetic flux sensors 964-1 . . . 964-n are implemented as conductive loops they may have a variety of different configurations in order to detect different directional components of the magnetic field 512 based on the configuration of the transmit coil 508 or the receive coil 538. FIG. 10D illustrates a conductive loop 1064-a having a circular configuration for detecting or being more sensitive to a first directional component of the magnetic field 512 (e.g., to determine magnetic flux level based on a directionality of the field 512). FIG. 10E illustrates another conductive loop 1064-b having a double D configuration for detecting or being more sensitive to a second (different) directional component of the magnetic field 512 as compared to FIG. 10D.

For example, if the transmit coil 508 is configured in a DD topology as shown in FIG. 1, then a circular conductive loop 1064-a as shown in FIG. 10D may be included as the circular conductive loop 1064-a may be more sensitive to detecting a magnetic flux level based on a direction of the field at the surface of the transmit coil 508. If the transmit coil 508 is configured in a circular topology as shown in FIG. 1A, then a DD conductive loop 1064-b may be included as the DD conductive loop 1064-b may be more sensitive to detecting a magnetic flux level based on a direction of the filed at the surface of the transmit coil 508. In addition, other wireless power transfer coil topologies (e.g., the bi-polar, solenoid or the topologies mentioned above) may generate magnetic fields that have different directional components at different locations. As such a combination of different topologies (e.g., flux sensors that are sensitive to different directional components of the magnetic field 512) may be used such as a combination of the conductive loop 1064-a and the conductive loop 1064-b where the position of the different types of conductive loops is based on the direction of the magnetic field at the surface of the housing 110.

Figure 11:
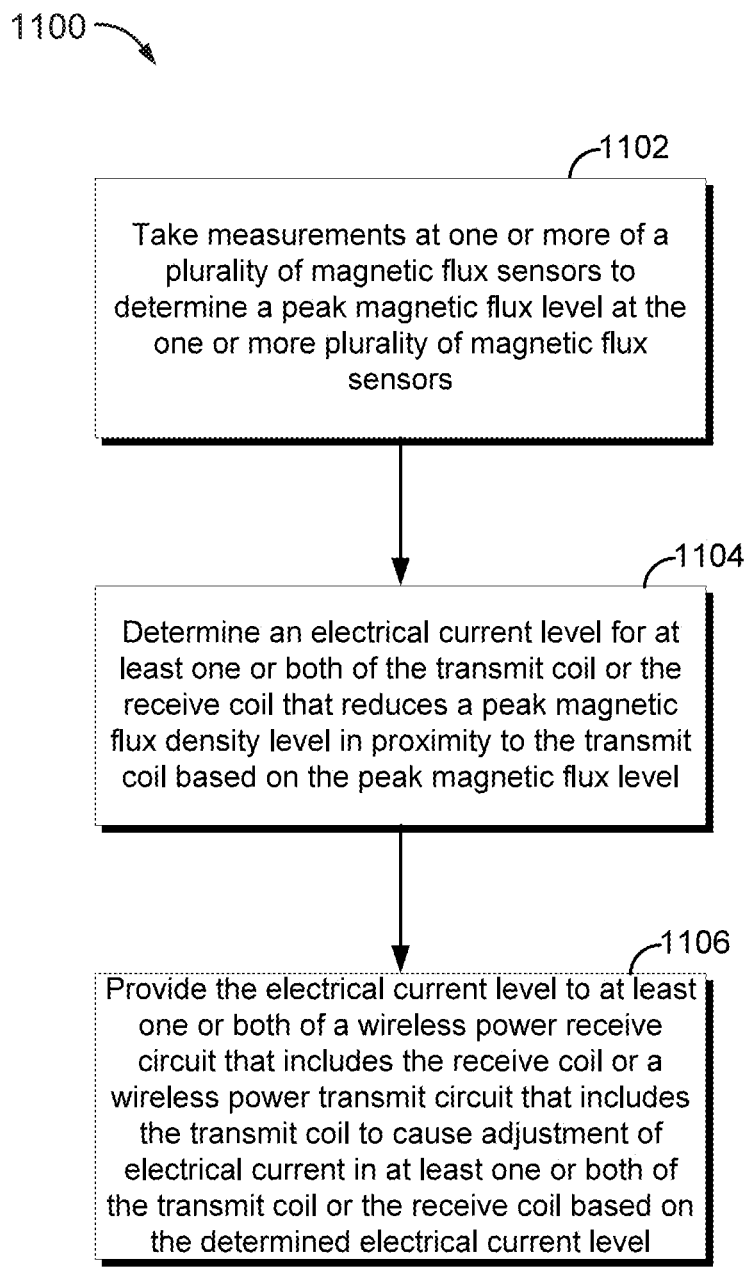
FIG. 11 is a flow diagram of an example of another method for controlling wireless power transfer.

FIG. 11 is a flow diagram of an example of another method 1100 for controlling wireless power transfer. The method 1100 is described with reference to the elements of FIG. 9, however, as noted above, operations described may be performed using any suitable circuitry or component, which may provide means for implementing one or more of the operations.

At operational block 1102, the method 1100 includes taking measurements at one or more of a plurality of magnetic flux sensors 964-1 . . . 964-n to determine a peak magnetic flux level at the one or more plurality of magnetic flux sensors 964-1 . . . 964-n. For example, a flux measurement circuit 960 operatively connected to the magnetic flux sensors 964-1 . . . 964-n may take the measurements.

At operational block 1104, the method 1100 further includes determining an electrical current level for at least one or both of the transmit coil 508 or the receive coil 538 that reduces a peak magnetic flux density level in proximity to the transmit coil 508 based on the peak magnetic flux level. This is further described above with reference to FIGS. 5 and 6.

At operational block 1106, the method 1100 further includes providing the electrical current level to at least one or both of a wireless power receive circuit 530 that includes the receive coil 538 or a wireless power transmit circuit 502 that includes the transmit coil 508 to cause adjustment of electrical current in at least one or both of the transmit coil 508 or the receive coil 538 based on the determined electrical current level. This is further described above with reference to FIGS. 5 and 6.

Figure 12:
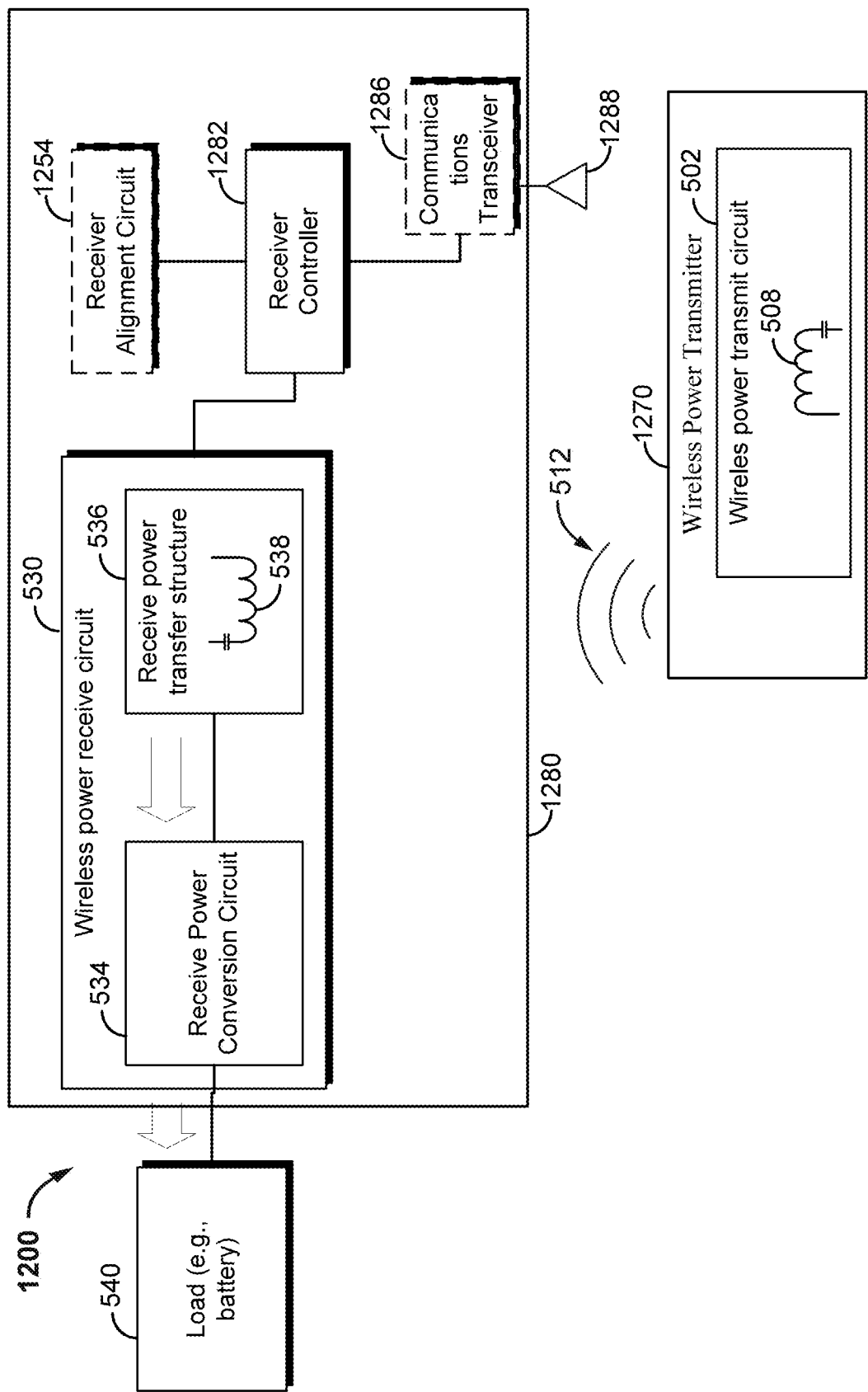
FIG. 12 is a functional block diagram of an example implementation of a wireless power transfer system for reducing magnetic flux density where the controller of FIG. 5 is a receive controller in a wireless power receiver.
Figure 13:
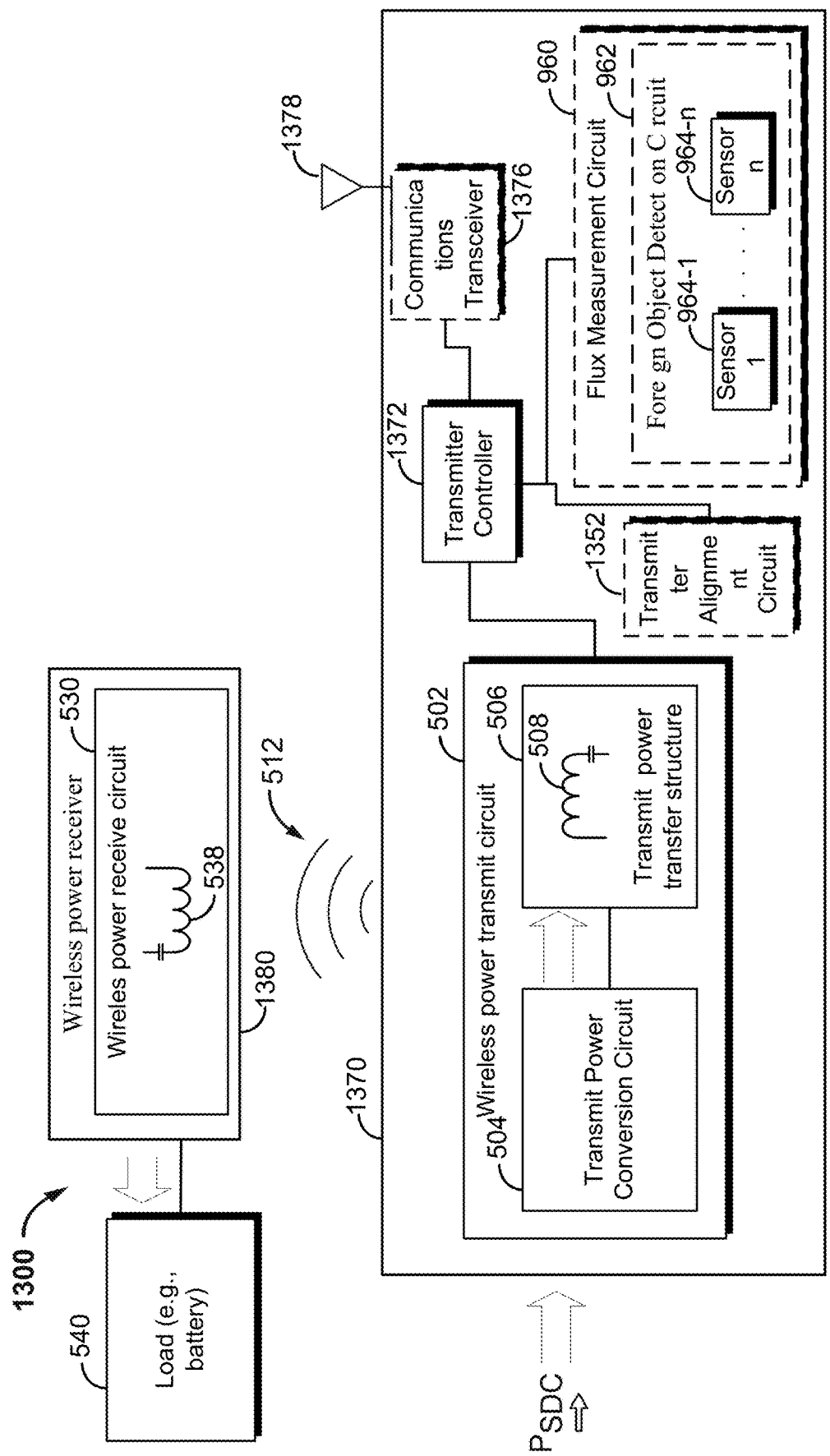
FIG. 13 is a functional block diagram of an example implementation of a wireless power transfer system for reducing magnetic flux density where the controller of FIG. 5 is a transmitter controller in a wireless power transmitter.
Figure 14:
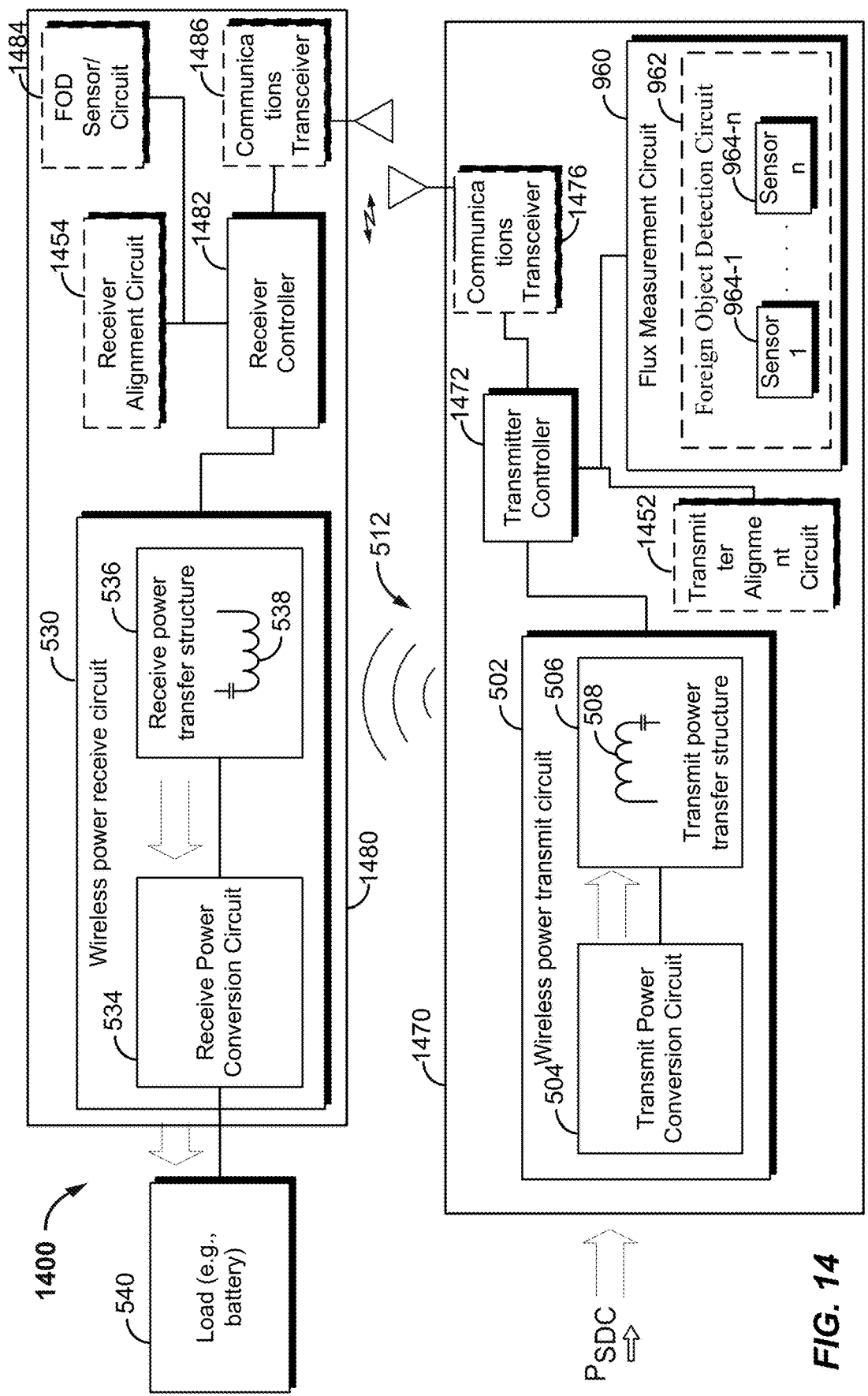
FIG. 14 is a functional block diagram of an example implementation of a wireless power transfer system for reducing magnetic flux density that includes the wireless power receiver of FIG. 12 and the wireless power transmitter of FIG. 13.

FIGS. 5, 7, and 9 show a controller 532 that is operatively to at least one or both of the wireless power receive circuit 530 or the wireless power transmit circuit 502. FIGS. 12, 13, and 14 show different implementations of which portion of the system may include the controller 532 and additional components to support information transfer between the transmitter and receiver.

FIG. 12 is a functional block diagram of an example implementation of a wireless power transfer system 1200 for reducing magnetic flux density where the controller 532 of FIG. 5 is a receive controller 1282 in a wireless power receiver 1280. The system 1200 includes a wireless power transmitter 1270 configured to generate a magnetic field 512 for inductively transferring power to the wireless power receiver 1280. The wireless power receiver 1280 includes a wireless power receive circuit 530 with components shown as in FIG. 5. The wireless power receive circuit 530 is operatively connected to a receiver controller 1282 that can be configured similarly to the controller 532 and perform the functionality as described above with reference to FIGS. 5-11.

For implementations that rely on alignment information for the magnetic flux level determination, the wireless power receiver 1280 may include a receiver alignment circuit 1254 operatively connected to the receive controller 1282 and configured similarly as the alignment circuit 750 described with reference to FIG. 7. However, as in some cases the alignment information may be determined by the wireless power transmitter 1270 this is shown by a dashed line around the receiver alignment circuit 1254. The wireless power receiver 1280 further may include a communications transceiver 1286 operatively connected to the receiver controller 1282. This may be where the receive controller 1282 is configured to provide an electrical current level for the wireless power transmitter 1270 to the wireless power transmitter 1270 via the communications transceiver 1286. The communications transceiver 1286 is operatively connected to a communications antenna 1288. As mentioned above, there may be situations in where the receiver controller 1282 determines an electrical current level for only the receive coil 538, for the receive coil 538 and the transmit coil 508, or only the transmit coil 508.

As such, the receiver controller 1282 may receive or determine the measured or estimated magnetic flux level as described above with reference to FIG. 5 or 6 and then determine an electrical current level that reduces a peak magnetic flux density level in proximity to the transmit coil 508 based on the measured or estimated magnetic flux level. In one implementation, the electrical current level is a first electrical current level for the receive coil 538. In this case, the receiver controller 1282 is configured to provide the first electrical current level to the wireless power receive circuit 530. The wireless power receive circuit 530 is configured to adjust electrical current in the receive coil 538 based on the first electrical current level. In another implementation, the electrical current level is a second electrical current level for the receive coil 538 and a third electrical current level for the transmit coil 508. In this case, the receive controller 1282 is configured to provide the second electrical current level to the wireless power receive circuit 530 and wirelessly transmit the third electrical current level via the communications transceiver 1286 to the wireless power transmit circuit 502. The wireless power receive circuit 530 is configured to adjust electrical current in the receive coil 538 based on the second electrical current level. In yet another implementation, the electrical current level is a fourth electrical current level for the transmit coil 508. In this case, the receiver controller 1282 is configured to wirelessly transmit the fourth electrical current level via the communications transceiver 1286 to the wireless power transmit circuit 502.

FIG. 13 is a functional block diagram of an example implementation of a wireless power transfer system 1300 for reducing magnetic flux density where the controller 532 of FIG. 5 is a transmitter controller 1372 in a wireless power transmitter 1370. The system 1300 includes a wireless power receiver 1380 configured to inductively receive power via a magnetic field 512 generated by the wireless power transmitter 1370. The wireless power transmitter 1370 includes a wireless power transmit circuit 502 with components shown as in FIG. 5. The wireless power transmit circuit 502 is operatively connected to a transmitter controller 1372 that can be configured similarly to the controller 532 and perform the functionality as described above with reference to FIGS. 5-11.

For implementations that rely on alignment information for the magnetic flux level determination, the wireless power transmitter 1370 may include a transmitter alignment circuit 1352 operatively connected to the transmitter controller 1372 and configured similarly as the alignment circuit 750 described with reference to FIG. 7. The transmitter alignment circuit 1452 is shown as a dotted line to reflect that in some implementations alignment information may be determined by the wireless power receiver 1380.

For implementations that rely on flux measurement information, the wireless power transmitter 1370 may include a flux measurement circuit 960 operatively connected to the transmitter controller 1372 and configured similarly as the flux measurement circuit 960 described with reference to FIG. 9. The flux measurement circuit 960 is shown as a dotted line to reflect that this flux measurement information could be implemented outside the wireless power transmitter 1370. The wireless power transmitter 1370 may further include a communications transceiver 1376 operatively connected to the transmitter controller 1372. This may be where the transmitter controller 1372 is configured to provide an electrical current level for the wireless power receiver 1380 to the wireless power receiver 1380 via the communications transceiver 1376. The communications transceiver 1376 is operatively connected to a communications antenna 1378. As mentioned above there may be situations in where the transmitter controller 1372 determines an electrical current level for only the receive coil 538, for the receive coil 538 and the transmit coil 508, or only the transmit coil 508.

As such, the transmitter controller 1372 may receive or determine the measured or estimated magnetic flux level as described above with reference to FIG. 5 or 6 and then determine an electrical current level. In one implementation, the electrical current level is a first electrical current level for the transmit coil 508. In this case, the transmitter controller 1372 is configured to provide the first electrical current level to the wireless power transmit circuit 502. The wireless power transmit circuit 502 is configured to adjust electrical current in the transmit coil 508 based on the first electrical current level. In another implementation, the electrical current level is a second electrical current level for the transmit coil 508 and a third electrical current level for the receive coil 538. In this case, the transmitter controller 1372 is configured to provide the second electrical current level to the wireless power transmit circuit 502 and wirelessly transmit the third electrical current level via the communications transceiver 1376 to the wireless power receive circuit 530. The wireless power transmit circuit 502 is configured to adjust electrical current in the transmit coil 508 based on the second electrical current level. In yet another implementation, the electrical current level is a fourth electrical current level for the receive coil 538. In this case, the transmitter controller 1372 is configured to wirelessly transmit the fourth electrical current level via the communications transceiver 1376 to the wireless power receive circuit 530.

With respect to the method 600 of FIG. 6, the method 600 includes determining an electrical current level at operational block 604 and providing the electrical current level to at least one or both of the wireless power receive circuit 530 or the wireless power transmit circuit 502. In conjunction with FIG. 12, where the controller 532 is a receiver controller 1282, the electrical current level described with respect to FIG. 6 may be a first electrical current level for the receive coil 538. Providing the electrical current level may include providing the first electrical current level to the wireless power receive circuit 530. The method 600 may further include adjusting electrical current in the receive coil via the wireless power receive circuit 530 based on the first electrical current level. In another scenario, the electrical current level is a second electrical current level for the receive coil 538 and a third electrical current level for the transmit coil 508. In this case, providing the electrical current level may include providing the second electrical current level to the wireless power receive circuit 530 and wirelessly transmitting the third electrical current level to the wireless power transmit circuit 502. The method 600 may further include adjusting electrical current in the receive coil 538 via the wireless power receive circuit 530 based on the second electrical current level. In another scenario, the electrical current level is a fourth electrical current level for the transmit coil 508. Providing the electrical current level may include wirelessly transmitting the fourth electrical current level to the wireless power transmit circuit 502.

In conjunction with FIG. 13 and FIG. 6, where the controller 532 is a transmitter controller 1372, the electrical current level may a fifth electrical current level for the transmit coil 508. Providing the electrical current level as shown in operational block 606 of FIG. 6 may include providing the fifth electrical current level to the wireless power transmit circuit 502. The method 600 may further include adjusting electrical current in the transmit coil 508 via the wireless power transmit circuit 502 based on the fifth electrical current level. In another scenario, the electrical current level is a sixth electrical current level for the transmit coil 508 and a seventh electrical current level for the receive coil 538. Providing the electrical current level may include providing the sixth electrical current level to the wireless power transmit circuit 502 and wirelessly transmitting the seventh electrical current level to the wireless power receive circuit 530. The method may further include adjusting electrical current in the transmit coil 508 via the wireless power transmit circuit 502 based on the sixth electrical current level. In another scenario, the electrical current level is an eighth electrical current level for the receive coil 538. Providing the electrical current level may include wirelessly transmitting the eighth electrical current level to the wireless power receive circuit 530.

FIG. 14 is a functional block diagram of an example implementation of a wireless power transfer system 1400 for reducing magnetic flux density that includes the wireless power receiver 1480 of FIG. 12 and the wireless power transmitter 1470 of FIG. 13. The wireless power transmitter 1470 of FIG. 14 includes all the components shown in the wireless power transmitter 1370 FIG. 13. Likewise, the wireless power receiver 1480 of FIG. 14 includes all the components shown in the wireless power receiver 1280 FIG. 12. In addition, the wireless power receiver 1480 includes a foreign object detection sensor/circuit 1484 that is operably connected to the receiver controller 1482. This will be described in further detail below. The receiver alignment circuit 1454 may optionally also be included.

FIG. 14 illustrates implementations where the receiver controller 1482 and transmitter 1470 may work together to accomplish the functionality described with respect to FIGS. 5-11. Any of the functionality described above with respect to FIGS. 5-11 may be generally interchangeable regarding which component determines the alignment information, flux measurements, and determination of magnetic flux levels or current levels. For example, the receiver controller 1482 can be configured to determine an estimated or measured magnetic flux level per the description above and wirelessly transmit the measured or estimated magnetic flux level via the communications transceiver 1486 to the wireless power transmitter 1470. The transmitter controller 1472 may be configured to determine the electrical current level for reducing magnetic flux as described above based on the received magnetic flux level. Particularly in this case each of the transmitter controller 1472 and the receiver controller 1482 could determine respective currents for the transmit coil 508 and the receive coil 538 based on the magnetic flux level determined by the receiver controller 1482. Likewise, the transmitter controller 1472 can be configured to determine an estimated or measured magnetic flux level per the description above and wirelessly transmit the measured or estimated magnetic flux level via the communications transceiver 1476 to the wireless power receiver 1480. The receiver controller 1482 may be configured to determine the electrical current level for reducing magnetic flux as described above based on the received magnetic flux level.

As shown in FIG. 14, in another implementation the wireless power receiver 1480 includes a foreign object detection sensor/circuit 1484. In an implementation this may be in addition to a foreign object detection circuit 962 included in the wireless power transmitter 1470. The foreign object detection sensor/circuit 1484 at the wireless power receiver 1480 is configured to monitor an area over the transmit coil 508. This area may be constrained by a dimension of the receive coil 538 that is smaller than the transmit coil 508. As such, the area directly under the receive coil 538 may be monitored which may also correspond with the area of increased flux directly under the receive coil 538. The receive controller 1482 is configured receive object detection information indicating an object detected by the foreign object detection sensor/circuit 1484. The receiver controller 1482 or the transmitter controller 1472 is further configured to determine the electrical current level based on the object detection information from the foreign object detection sensor/circuit 1484. In some implementations the determined electrical current level may be substantially zero. Stated another way, if an object is detected by the foreign object detection sensor/circuit 1484 then the system reduces power output or prevent power from being transferred until the object is cleared. The foreign object detection sensor/circuit 1484 may include sensors and/or components that enable an object on the surface of the housing 110 of the transmit coil 508 to be detected (e.g., thermal camera/thermal sensor, infra-red, computer vision detection, and the like). Because the area for which needs to be monitored may be small as compared to the area of the entire transmit coil 508 the implementation may be less costly or less complicated.

As such, in accordance with an implementation the foreign object detection sensor/circuit 1484 may include one or more foreign object detection sensors (not shown) configured to monitor an area over a transmit coil 508 configured to generate the magnetic field 512. The area monitored has a size corresponding more closely with a size of a housing configured to house the receive coil 538 than to a size of the transmit coil 508, the size smaller than an outer dimension of the transmit coil 508.

The wireless power transmitter 1470 may also include a foreign object detection circuit 962 that is configured to monitor a larger area including an area covered by the transmit coil 508. If surface flux is maintained below a threshold, the foreign object detection circuit 962 may be configured to be less sensitive (e.g., detect larger objects) as compared to if required to detect all small objects for higher magnetic flux levels at the surface. Because the area of increased magnetic flux due to influence of the of the receiver coil 538 is also monitored (e.g., for small objects) the overall foreign object detection system may be more sensitive and have redundancy and better resilience to false positives. Addition, this combination of foreign object detection circuits may overall be less costly than a system implemented at the wireless power transmitter 1470 that is sensitive enough to detect all small objects at higher magnetic flux levels.

Figure 15:
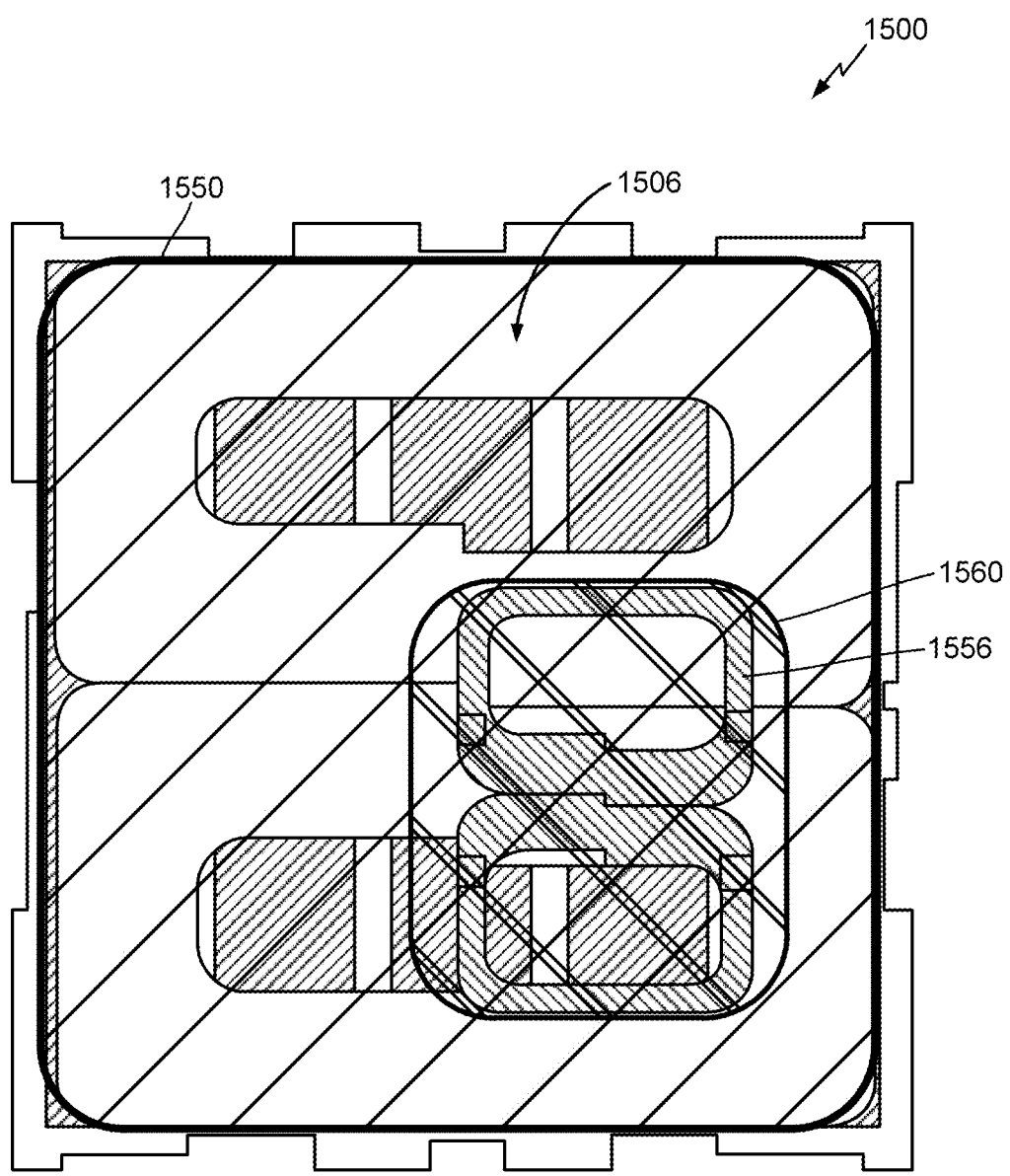
FIG. 15 is an illustration of a wireless power transfer system with a wireless power transmit structure and a wireless power receive structure with foreign object detection monitoring.

FIG. 15 is an illustration of a wireless power transfer system 1500 with a wireless power transmit structure 1506 and a wireless power receive structure 1556 with foreign object detection monitoring. For example, an area 1550 is shown which may correspond to an area monitored by a foreign object detection circuit 962 implemented by the wireless power transmitter 1470. An area 1560 may correspond to an area monitored by a foreign object detection sensor/circuit 1484 implemented by a wireless power receiver 1480. The area 1560 may correspond to an area about the size of the receive coil 538 and monitor an area directly under the receive coil 538 that may correspond to a higher magnetic flux level as compared to level in the absence of the receiver coil 538. Sensitivity in the area 1550 (resulting in less complicated/costly foreign object detection system in the wireless power transmitter 1470) may be reduced if in the areas it is known that the magnetic flux levers will not go above a threshold.

As such, with respect to FIG. 14, the foreign object detection circuit 962 may correspond to a first foreign object detection circuit operatively connected to the transmit controller 1472 and configured to detect one or more objects within the magnetic field. The FOD Sensor/Circuit 1484 of the wireless power receiver 1480 may correspond to a second foreign object detection circuit operatively connected to at least one of the power transmit controller 1472 or the power receive controller 1482. The second foreign object detection circuit is configured to monitor an area over the transmit coil 508, the area having a first size corresponding more closely with a size of the second outer dimension of the receive coil 538 than to a second size of the first outer dimension of the transmit coil 508.

The techniques and implementations described above with reference to FIGS. 1-15 may have a variety of benefits as already discussed. The techniques and implementations may allow for causing magnetic flux levels to remain near or below threshold levels at the surface of the housing 110 configured to house the transmit coil 508. The levels may be maintained despite the influence on flux of a receiver coil 538 at various alignment positions or heights above the transmit coil 508. In this way the temperature of objects that may interact with the magnetic field 512 may be maintained below undesirable levels. This may allow for less complicated or less costly foreign object detection systems which may simplify and reduce the cost of the entire system. In addition, other aspects such as emissions and other power transfer efficiency considerations may be better controlled or reduced if either the magnetic flux is below a level or the magnetic flux level is more stable or predictable. Furthermore, the techniques/implementations described above allow for maintain power transfer at or above a threshold but while also reducing peak magnetic flux densities. Other benefits may also be readily appreciated by one of ordinary skill in the art.

The systems and components above with respect to FIGS. 1-15 may be integrated into a wireless electric vehicle charging (WEVC) system. For example, the wireless power receive circuit 156 (FIG. 1B) may be incorporated into a vehicle (e.g., affixed to an underside of the vehicle) and may receive power from a ground based installation including the wireless power transfer circuit 154.

Figure 16:
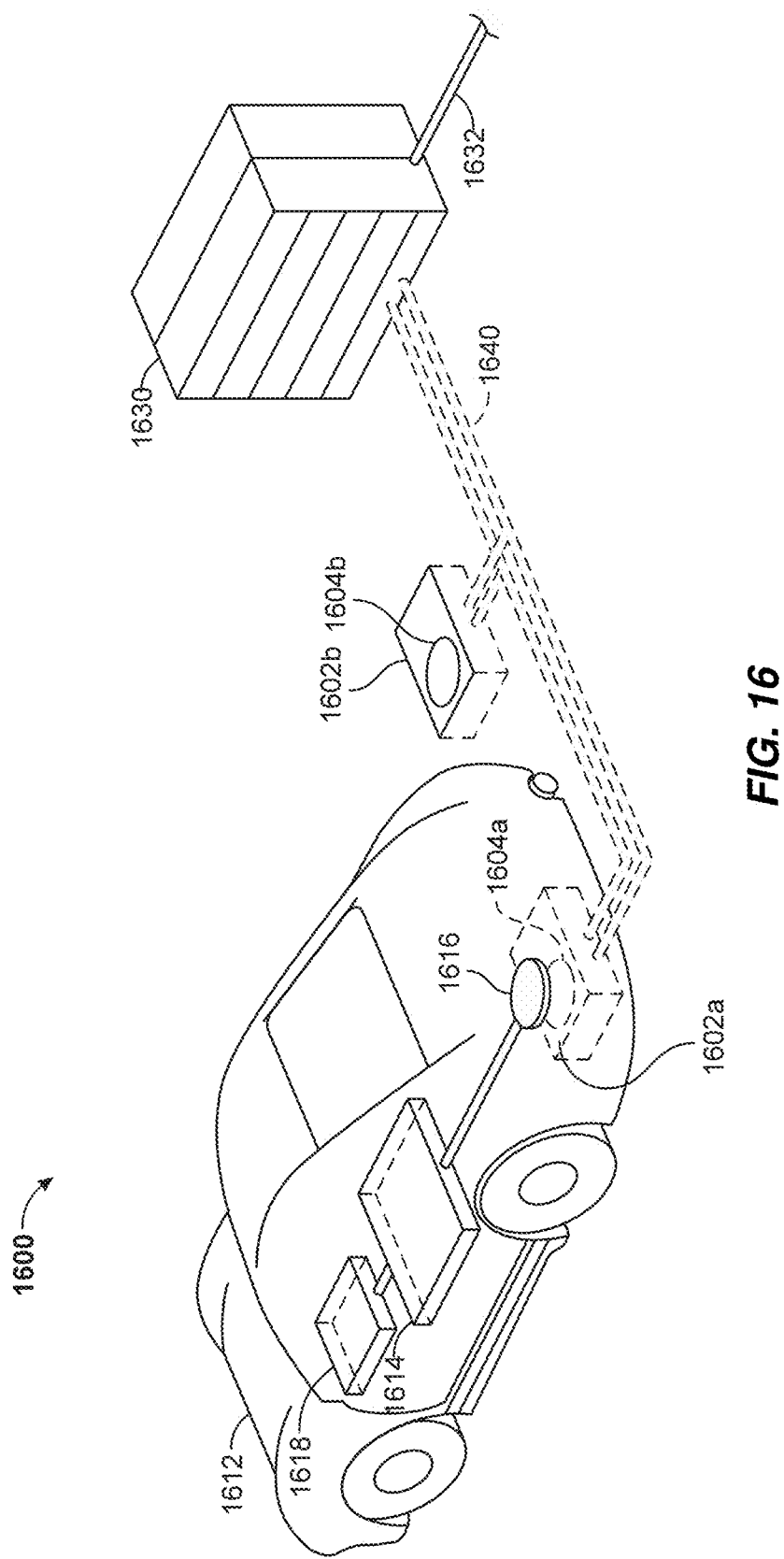
FIG. 16 illustrates a wireless power transfer system for charging an electric vehicle in which any of the elements/functionality described with reference to FIGS. 1-15 may be implemented.

FIG. 16 illustrates a wireless power transfer system 1600 for charging an electric vehicle in which any of the elements/functionality described with reference to FIGS. 1-15 may be implemented.

The wireless power transfer system 1600 enables charging of an electric vehicle 1612 while the electric vehicle 1612 is parked so as to wirelessly couple power from a base wireless charging system 1602a. The base wireless charging system 1602a may correspond to the wireless power transfer circuit 102 as described with reference to FIG. 1 (e.g. and particularly incorporate the wireless power transmit circuit 154 shown in FIG. 1B and as further described with reference to FIGS. 1-15 and with respect to the transmitter). Spaces for two electric vehicles are illustrated in a parking area to be parked over corresponding base wireless charging systems 1602a and 1602b. In some implementations, a local distribution center 1630 may be connected to a power backbone 1632 and configured to provide an alternating current (AC) or a direct current (DC) supply through a power link 1640 to the base wireless charging systems 1602a and 1602b. Each of the base wireless charging systems 1602a and 1602b also includes a base coil 1604a and 1604b, respectively, for wirelessly transferring power. The base coil 1604a and 1604b may correspond to the transmit coil 508 described above.

The electric vehicle 1612 may include a battery unit 1618, an electric vehicle coil 1616, and an electric vehicle wireless charging unit 1614. The electric vehicle wireless charging unit 1614 and the electric vehicle coil 1616 constitute the electric vehicle wireless charging system. The electric vehicle wireless charging system may correspond to the wireless power transfer circuit 102 of FIG. 1 (e.g. and particularly incorporate the wireless power receive circuit 156 shown in FIG. 1B and as further described with reference to FIGS. 1-15 with respect to the receiver side). The electric vehicle coil 1616 may correspond to the receive coil 538 as described above.

The electric vehicle coil 1616 may receive power when the electric vehicle coil 1616 is located in an electromagnetic field produced by the base coil 1604a. The field may correspond to a region where energy output by the base coil 1604a may be captured by the electric vehicle coil 1616. For example, the energy output by the base coil 1604a may be at a level sufficient to charge or power the electric vehicle 1612.

In some implementations the electric vehicle coil 1616 may be aligned with the base coil 1604a and, therefore, disposed within a near-field region simply by the electric vehicle operator positioning the electric vehicle 1612 such that the electric vehicle coil 1616 is sufficiently aligned relative to the base coil 1604a. Alignment may be considered sufficient when an alignment error has fallen below a tolerable value. In other implementations, the operator may be given visual and/or auditory feedback to determine when the electric vehicle 1612 is properly placed within a tolerance area for wireless power transfer. In yet other implementations, the electric vehicle 1612 may be positioned by an autopilot system, which may move the electric vehicle 1612 until the sufficient alignment is achieved. This may be performed automatically and autonomously by the electric vehicle 1612 with or without driver intervention. This may be possible for an electric vehicle 1612 that is equipped with a servo steering, radar sensors (e.g., ultrasonic sensors), and intelligence for safely maneuvering and adjusting the electric vehicle. In still other implementations, the electric vehicle 1612 and/or the base wireless charging system 1602a may have functionality for mechanically displacing and moving the coils 1616 and 1504a, respectively, relative to each other to more accurately orient or align them and develop sufficient and/or otherwise more efficient coupling there between.

The base wireless charging system 1602a may be located in a variety of locations. As non-limiting examples, some suitable locations include a parking area at a home of the electric vehicle 1612 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 1600. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 1612 may be used as distributed storage devices to stabilize a power grid, a convenient docking-to-grid solution may help to increase availability of vehicles for vehicle-to-grid (V2G) operation.

The wireless power transfer system 1600 as described with reference to FIG. 16 may also provide aesthetical and non-impedimental advantages. For example, there may be no charge columns and cables that may be impedimental for vehicles and/or pedestrians.

While an example has provided for the implementations described herein to be part of an electric vehicle charging system, other these techniques/implementations described with reference to FIGS. 1-15 may be used for other wireless power applications such as for portable electronic device charging and the like.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general-purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The bus may also link various other circuits such as timing sources, peripherals, voltage regulators, power management circuits, and the like.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for controlling wireless power transfer, the apparatus comprising:
a controller operatively connected to at least one of a wireless power receive circuit that includes a receive coil or a wireless power transmit circuit that includes a transmit coil configured to inductively transfer power to the receive coil via a magnetic field,
the controller configured to:
receive or determine a measured or estimated magnetic flux level on or outside a surface of a housing configured to house the transmit coil;
determine an electrical current level for at least one of the transmit coil or the receive coil that:
reduces a peak magnetic flux density level in proximity to the transmit coil based on the measured or estimated magnetic flux level;
enables a power level of power transferred from the wireless power transmit circuit to the wireless power receive circuit to be maintained at or above a threshold; and
corresponds to a first electrical current level for the transmit coil and a second electrical current level for the receive coil;
increase the first electrical current level and correspondingly decrease the second electrical current level, or decrease the first electrical current level and correspondingly increase the second electrical current level; and provide the electrical current level to at least one of the wireless power receive circuit or the wireless power transmit circuit to cause adjustment of electrical current in at least one of the transmit coil or the receive coil based on the determined electrical current level.

2. The apparatus of claim 1, wherein the measured or estimated magnetic flux level corresponds to a magnetic flux level that is at a first location on or outside the surface of the housing, the magnetic flux level higher than magnetic flux levels at one or more other locations on or outside the surface of the housing.

3. The apparatus of claim 1, wherein the measured or estimated magnetic flux level corresponds to a peak magnetic flux level across the surface of the housing.

4. The apparatus of claim 1, wherein the receive coil is smaller than the transmit coil and wherein the measured or estimated magnetic flux level corresponds to magnetic flux levels at a location where the receive coil overlaps with the transmit coil.

5. The apparatus of claim 1, wherein the controller is further configured to receive alignment information indicating an alignment position of the receive coil relative to the transmit coil, wherein the controller is configured to determine the measured or estimated magnetic flux level based on the alignment information.

6. The apparatus of claim 5, wherein the controller is further configured to determine the measured or estimated magnetic flux level based on the alignment information and a measured or estimated magnetic coupling level between the transmit coil and the receive coil.

7. The apparatus of claim 6, wherein the controller is configured to determine the measured or estimated magnetic flux level via at least one of:
  a look-up table indexed by the alignment information and the measured or estimated magnetic coupling level; or
  a pre-defined function using inputs based on the alignment information and the measured or estimated magnetic coupling level.

8. The apparatus of claim 1, wherein the measured or estimated magnetic flux level is from a flux measurement circuit comprising a plurality of magnetic flux sensors positioned in proximity to the transmit coil, wherein the flux measurement circuit is configured to determine the measured or estimated magnetic flux level based on measurements at one or more of the plurality of magnetic flux sensors.

9. The apparatus of claim 8, further comprising the flux measurement circuit operatively connected to the controller, wherein the plurality of magnetic flux sensors correspond to each of a plurality of conductive loops different from and smaller than the transmit coil.

10. The apparatus of claim 9, wherein the measured or estimated magnetic flux level corresponds to a first location on the surface of the housing and wherein the first location corresponds to a loop position of one of the plurality of conductive loops where the measured or estimated magnetic flux level at the one of the plurality of conductive loops is higher than magnetic flux levels measured at one or more of other loops of the plurality of conductive loops.

11. The apparatus of claim 9, further comprising a foreign object detection circuit comprising the plurality of conductive loops and configured to detect one or more objects positioned within the magnetic field.

12. The apparatus of claim 1, further comprising a communications transceiver, wherein the controller is configured to at least one of:
  wirelessly transmit the measured or estimated magnetic flux level via the communications transceiver to a transmitter controller operatively connected to the wireless power transmit circuit; or
  wirelessly transmit the measured or estimated magnetic flux level via the communications transceiver to a receiver controller operatively connected to the wireless power receive circuit.

13. The apparatus of claim 1, further comprising a foreign object detection circuit configured to monitor an area over the transmit coil, the area constrained by a first dimension of the receive coil that is smaller than a second dimension of the transmit coil, wherein the controller is further configured to receive object detection information indicating an object has been detected by the foreign object detection circuit, wherein the controller is further configured to determine the electrical current level based on the object detection information from the foreign object detection circuit.

14. The apparatus of claim 1, wherein the controller is configured as part of a wireless electric vehicle charging system that includes the wireless power transmit circuit and the wireless power receive circuit.

15. The apparatus of claim 1, wherein the threshold is approximately 8 kW.

16. The apparatus of claim 1, wherein the threshold is substantially equivalent to a power output of the wireless power transmit circuit when the measured or estimated magnetic flux levels are received or determined such that the power output is maintained during the adjustment of the electrical current in the at least one of the transmit coil or the receive coil.

17. An apparatus for controlling wireless power transfer, the apparatus comprising:
  a wireless power receive circuit that includes a receive coil configured to inductively receive power transferred from a transmit coil of a wireless power transmit circuit via a magnetic field; and
  a controller operatively connected to the wireless power receive circuit, the controller configured to:
    receive or determine a measured or estimated magnetic flux level on or outside a surface of a housing configured to house the transmit coil;
    determine an electrical current level for at least one of the transmit coil or the receive coil that:
      reduces a peak magnetic flux density level in proximity to the transmit coil based on the measured or estimated magnetic flux level; and
      enables a power level of power transferred from the wireless power transmit circuit to the wireless power receive circuit to be maintained at or above a threshold; and
    provide the electrical current level to at least one of the wireless power receive circuit or the wireless power transmit circuit to cause adjustment of electrical current in at least one of the transmit coil or the receive coil based on the determined electrical current level,
  wherein at least one of:
    the electrical current level is a first electrical current level for the receive coil and wherein the controller is configured to provide the first electrical current level to the wireless power receive circuit, wherein the wireless power receive circuit is configured to adjust electrical current in the receive coil based on the first electrical current level; or the apparatus further comprises a communications transceiver operatively connected to the controller, wherein the electrical current level is a second electrical current level for the receive coil and a third electrical current level for the transmit coil and wherein the controller is configured to provide the second electrical current level to the wireless power receive circuit and wirelessly transmit the third electrical current level via the communications transceiver to the wireless power transmit circuit, wherein the wireless power receive circuit is configured to adjust electrical current in the receive coil based on the second electrical current level; or the apparatus further comprises a communications transceiver operatively connected to the controller, wherein the electrical current level is a fourth electrical current level for the transmit coil and wherein the controller is configured to wirelessly transmit the fourth electrical current level via the communications transceiver to the wireless power transmit circuit.

18. An apparatus for controlling wireless power transfer, the apparatus comprising:
   a wireless power transmit circuit that includes a transmit coil configured to inductively transfer power to a receive coil of a wireless power receive circuit via a magnetic field; and
   a controller operatively connected to the wireless power transmit circuit the controller configured to:
      receive or determine a measured or estimated magnetic flux level on or outside a surface of a housing configured to house the transmit coil;
      determine an electrical current level for at least one of the transmit coil or the receive coil that:
         reduces a peak magnetic flux density level in proximity to the transmit coil based on the measured or estimated magnetic flux level; and
         enables a power level of power transferred from the wireless power transmit circuit to the wireless power receive circuit to be maintained at or above a threshold; and
      provide the electrical current level to at least one of the wireless power receive circuit or the wireless power transmit circuit to cause adjustment of electrical current in at least one of the transmit coil or the receive coil based on the determined electrical current level,
   wherein at least one of:
      the electrical current level is a first electrical current level for the transmit coil and wherein the controller is configured to provide the first electrical current level to the wireless power transmit circuit, wherein the wireless power transmit circuit is configured to adjust electrical current in the transmit coil based on the first electrical current level; or
      the apparatus further comprises a communications transceiver operatively connected to the controller, wherein the electrical current level is a second electrical current level for the transmit coil and a third electrical current level for the receive coil and wherein the controller is configured to provide the second electrical current level to the wireless power transmit circuit and wirelessly transmit the third electrical current level via the communications transceiver to the wireless power receive circuit, wherein the wireless power transmit circuit is configured to adjust electrical current in the transmit coil based on the second electrical current level; or the apparatus further comprises a communications transceiver operatively connected to the controller, wherein the electrical current level is a fourth electrical current level for the receive coil and wherein the controller is configured to wirelessly transmit the fourth electrical current level via the communications transceiver to the wireless power receive circuit.

19. A method for controlling wireless power transfer, the method comprising:
   receiving or determining a measured or estimated magnetic flux level on or outside a surface of a housing configured to house a transmit coil configured to inductively transfer power to a receive coil via a magnetic field;
   determining an electrical current level for at least one of the transmit coil or the receive coil that:
      reduces a peak magnetic flux density level in proximity to the transmit coil based on the measured or estimated magnetic flux level;
      maintains, at or above a threshold, a power level of power transferred from a wireless power transmit circuit, which includes the transmit coil, to a wireless power receive circuit, which includes the receive coil; and
      corresponds to a first electrical current level for the transmit coil and a second electrical current level for the receive coil,
      wherein determining the electrical current level comprises at least one of:
         increasing the first electrical current level and correspondingly decreasing the second electrical current level, or
         decreasing the first electrical current level and correspondingly increasing the second electrical current level; and
   providing the electrical current level to at least one of the wireless power receive circuit or the wireless power transmit circuit to cause adjustment of electrical current in at least one of the transmit coil or the receive coil based on the determined electrical current level.

20. The method of claim 19, wherein the measured or estimated magnetic flux level corresponds to at least one of:
   a magnetic flux level that is at a first location on or outside the surface of the housing, the magnetic flux level higher than magnetic flux levels at one or more other locations on or outside the surface of the housing; or
   a peak magnetic flux level across the surface of the housing configured to house the transmit coil.

21. The method of claim 19, further comprising receiving alignment information indicating an alignment position of the receive coil relative to the transmit coil, wherein determining the measured or estimated magnetic flux level comprises determining the measured or estimated magnetic flux level further based on the alignment information.

22. The method of claim 21, wherein determining the measured or estimated magnetic flux level comprises at least one of:
   indexing a look-up table by the alignment information and a measured or estimated magnetic coupling level; or
   determining an output of a pre-defined function using inputs based on the alignment information and a measured or estimated magnetic coupling level.

23. The method of claim 19, wherein the measured or estimated magnetic flux level is a measured magnetic flux level from a flux measurement circuit comprising a plurality of magnetic flux sensors positioned in proximity to the transmit coil, wherein the method further comprises taking measurements at one or more of the plurality of magnetic flux sensors to determine a peak magnetic flux level at the one or more plurality of magnetic flux sensors.

24. The method of claim 19, further comprising at least one of:
wirelessly transmitting the measured or estimated magnetic flux level to the wireless power transmit circuit; or
wirelessly transmitting the measured or estimated magnetic flux level to the wireless power receive circuit.

25. The method of claim 19, further comprising at least one of:
wirelessly receiving power at the wireless power receive circuit and providing the power to a load; or
wirelessly transmitting power via the wireless power transmit circuit to the wireless power receive circuit.

26. A method for controlling wireless power transfer, the method comprising:
receiving or determining a measured or estimated magnetic flux level on or outside a surface of a housing configured to house a transmit coil configured to inductively transfer power to a receive coil via a magnetic field;
determining an electrical current level for at least one of the transmit coil or the receive coil that:
reduces a peak magnetic flux density level in proximity to the transmit coil based on the measured or estimated magnetic flux level; and
maintains, at or above a threshold, a power level of power transferred from a wireless power transmit circuit, which includes the transmit coil, to a wireless power receive circuit, which includes the receive coil; and
providing the electrical current level to at least one of the wireless power receive circuit or the wireless power transmit circuit to cause adjustment of electrical current in at least one of the transmit coil or the receive coil based on the determined electrical current level,
wherein at least one of:
the electrical current level is a first electrical current level for the receive coil and wherein providing the electrical current level comprises providing the first electrical current level to the wireless power receive circuit, wherein the method further includes adjusting electrical current in the receive coil via the wireless power receive circuit based on the first electrical current level; or
the electrical current level is a second electrical current level for the receive coil and a third electrical current level for the transmit coil and wherein providing the electrical current level comprises providing the second electrical current level to the wireless power receive circuit and wirelessly transmitting the third electrical current level to the wireless power transmit circuit, wherein the method further includes adjusting electrical current in the receive coil via the wireless power receive circuit based on the second electrical current level; or
the electrical current level is a fourth electrical current level for the transmit coil and wherein providing the electrical current level comprises wirelessly transmitting the fourth electrical current level to the wireless power transmit circuit; or
the electrical current level is a fifth electrical current level for the transmit coil and wherein providing the electrical current level comprises providing the fifth electrical current level to the wireless power transmit circuit, wherein the method further includes adjusting electrical current in the transmit coil via the wireless power transmit circuit based on the fifth electrical current level; or
the electrical current level is a sixth electrical current level for the transmit coil and a seventh electrical current level for the receive coil and wherein providing the electrical current level comprises providing the sixth electrical current level to the wireless power transmit circuit and wirelessly transmitting the seventh electrical current level to the wireless power receive circuit, wherein the method further includes adjusting electrical current in the transmit coil via the wireless power transmit circuit based on the sixth electrical current level; or
the electrical current level is an eighth electrical current level for the receive coil and wherein providing the electrical current level comprises wirelessly transmitting the eighth electrical current level to the wireless power receive circuit.

* * * * *